United States Patent
Lawrence

(10) Patent No.: US 11,657,297 B2
(45) Date of Patent: May 23, 2023

(54) COMPUTER ARCHITECTURE FOR COMMUNICATIONS IN A CLOUD-BASED CORRELITHM OBJECT PROCESSING SYSTEM

(71) Applicant: BANK OF AMERICA CORPORATION, Charlotte, NC (US)

(72) Inventor: Patrick N. Lawrence, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 1401 days.

(21) Appl. No.: 15/966,669

(22) Filed: Apr. 30, 2018

(65) Prior Publication Data

US 2019/0332887 A1    Oct. 31, 2019

(51) Int. Cl.
*G06F 18/22* (2023.01)
*G06N 5/025* (2023.01)
*G06F 9/455* (2018.01)
*G06N 20/00* (2019.01)
*G06F 18/2113* (2023.01)
(Continued)

(52) U.S. Cl.
CPC ............ *G06N 5/025* (2013.01); *G06F 9/455* (2013.01); *G06F 18/2113* (2023.01); *G06N 20/00* (2019.01); *G06V 10/761* (2022.01); *G06V 40/172* (2022.01)

(58) Field of Classification Search
CPC ...... G06K 9/623; G06K 9/6215; G06F 9/455; G06N 20/00; G06N 5/025; G06N 5/045; G06V 10/75; G06V 10/761; G06V 40/172
See application file for complete search history.

(56) References Cited

U.S. PATENT DOCUMENTS

| | | | | |
|---|---|---|---|---|
| 4,811,333 A | * | 3/1989 | Rees ..................... | H04Q 11/04 370/228 |
| 5,946,673 A | | 8/1999 | Francone et al. | |

(Continued)

FOREIGN PATENT DOCUMENTS

| | | | | |
|---|---|---|---|---|
| WO | WO-9948019 A1 | * | 9/1999 | ............... G06N 3/10 |
| WO | WO-9953410 A1 | * | 10/1999 | ............. B82Y 10/00 |

(Continued)

OTHER PUBLICATIONS

John L. Hennessy and David A. Patterson, Computer Architecture: A Quantitative Approach (The Morgan Kaufmann Series in Computer Architecture and Design) (Year: 1990).*

(Continued)

*Primary Examiner* — Philip P. Dang

(57) ABSTRACT

A system that includes a first edge node and a second edge node in signal communication with one or more interior nodes. The first edge node is configured to receive a correlithm object from a first device outside of the network, to identify an input correlithm object from the first node table with the shortest distance, to fetch a corresponding correlithm object from the first node table, and to send the correlithm object to the one or more interior nodes. The second edge node is configured to receive a correlithm object from the one or more interior nodes, to identify an input correlithm object from a second node table with the shortest distance, to fetch a corresponding correlithm object from the second node table, and to send the correlithm object to a second device outside of the network.

17 Claims, 17 Drawing Sheets

(51) Int. Cl.
*G06V 10/74* (2022.01)
*G06V 40/16* (2022.01)

(56) References Cited

U.S. PATENT DOCUMENTS

| | | | | |
|---|---|---|---|---|
| 6,081,882 | A * | 6/2000 | Gossett | B82Y 10/00 977/933 |
| 6,167,391 | A * | 12/2000 | Lawrence | G06N 3/10 706/26 |
| 6,633,053 | B1 * | 10/2003 | Jaeger | G02F 3/00 257/14 |
| 6,687,404 | B1 * | 2/2004 | Hull | G06V 30/40 382/226 |
| 6,941,287 | B1 | 9/2005 | Vaidyanathan et al. | |
| 6,943,686 | B2 | 9/2005 | Allen | |
| 6,947,913 | B1 * | 9/2005 | Lawrence | G06N 20/00 706/14 |
| 7,015,835 | B2 * | 3/2006 | Lawrence | H03M 7/00 341/87 |
| 7,031,969 | B2 * | 4/2006 | Lawrence | G06F 16/313 707/E17.084 |
| 7,089,511 | B2 * | 8/2006 | Allen | G06F 30/39 716/103 |
| 7,246,129 | B2 * | 7/2007 | Lawrence | G06F 16/313 707/E17.084 |
| 7,272,155 | B2 * | 9/2007 | Kenney | H04L 41/0893 370/235 |
| 7,310,622 | B2 * | 12/2007 | Lawrence | G06N 10/00 706/14 |
| 7,349,928 | B2 * | 3/2008 | Lawrence | G06F 16/313 707/E17.084 |
| 7,752,332 | B2 * | 7/2010 | Jiang | H04W 40/20 709/238 |
| 7,805,440 | B2 * | 9/2010 | Farrell | G06F 16/9024 707/728 |
| 8,006,207 | B2 * | 8/2011 | Finkler | G06F 30/398 716/125 |
| 8,060,017 | B2 * | 11/2011 | Schlicht | H04L 1/0015 455/41.2 |
| 8,429,174 | B2 * | 4/2013 | Ramani | G06F 16/00 345/473 |
| 8,676,937 | B2 * | 3/2014 | Rapaport | G06Q 10/10 709/219 |
| 8,706,915 | B2 * | 4/2014 | Duchesneau | G06F 9/5072 709/250 |
| 8,768,048 | B1 * | 7/2014 | Kwatra | G06V 10/751 382/225 |
| 9,076,332 | B2 * | 7/2015 | Myr | G08G 1/04 |
| 9,081,501 | B2 * | 7/2015 | Asaad | G06F 15/76 |
| 9,443,192 | B1 * | 9/2016 | Cosic | G06N 5/048 |
| 10,061,999 | B1 * | 8/2018 | Kwatra | G06V 20/52 |
| 10,255,185 | B2 * | 4/2019 | Cook | G06F 9/5083 |
| 10,686,765 | B2 * | 6/2020 | Kumhyr | H04L 9/088 |
| 2004/0044940 | A1 * | 3/2004 | Lawrence | B82Y 10/00 714/746 |
| 2004/0088392 | A1 * | 5/2004 | Barrett | G08G 1/0104 709/223 |
| 2004/0207548 | A1 * | 10/2004 | Kilbank | H03M 7/30 341/107 |
| 2004/0208240 | A1 * | 10/2004 | Kilbank | H03M 7/30 375/222 |
| 2005/0203947 | A1 * | 9/2005 | Matzke | G06N 99/00 706/26 |
| 2009/0231173 | A1 * | 9/2009 | Kilbank | H03M 7/30 341/107 |
| 2009/0248376 | A1 * | 10/2009 | Silva | H04L 41/5009 703/2 |
| 2010/0142448 | A1 * | 6/2010 | Schlicht | H04W 28/021 370/328 |
| 2012/0016872 | A1 * | 1/2012 | Khorashadi | G01C 21/20 707/724 |
| 2015/0019930 | A1 * | 1/2015 | Heo | H03M 13/033 714/752 |
| 2016/0062749 | A1 * | 3/2016 | Stanfill | G06F 9/44505 717/144 |

FOREIGN PATENT DOCUMENTS

| | | | | |
|---|---|---|---|---|
| WO | WO-0175512 | A1 * | 10/2001 | B82Y 10/00 |
| WO | WO-2004015626 | A2 * | 2/2004 | B82Y 10/00 |
| WO | WO-2005091508 | A2 * | 9/2005 | H03M 7/00 |
| WO | WO-2008131446 | A2 * | 10/2008 | F25D 17/02 |

OTHER PUBLICATIONS

David A. Patterson, John L. Hennessy, Computer Organization and Design: The Hardware/Software Interface 2nd Edition (Year: 1997).*
Nick P. Lawrence, Correlithm Object Technology, (Year: 2004).*
Lawrence, P. N., "Computer Architecture for a Cloud-Based Correlithm Object Processing System," U.S. Appl. No. 15/966,786, filed Apr. 30, 2018, 84 pages.
Lawrence, P. N., "Computer Architecture for Emulating a Correlithm Object Converter in a Correlithm Object Processing System," U.S. Appl. No. 15/966,867, filed Apr. 30, 2018, 86 pages.
Lawrence, P. N., "Computer Architecture for Online Node Remapping in a Cloud-Based Correlithm Object Processing System," U.S. Appl. No. 15/966,956, filed Apr. 30, 2018, 86 pages.
Lawrence, P. N., "Computer Architecture for Emulating a Virtual Private Network in a Correlithm Object Processing System," U.S. Appl. No. 15/967,074, filed Apr. 30, 2013, 86 pages.
Lawrence, P. N., "Computer Architecture for Establishing Data Encryption in a Correlithm Object Processing System," U.S. Appl. No. 15/967,179, filed Apr. 30, 2018, 85 pages.
Lawrence, P. N., "Computer Architecture for Emulating Correlithm Object Diversity in a Correlithm Object Processing System," U.S. Appl. No. 15/967,301, filed Apr. 30, 2018, 86 pages.
Lawrence, P. N., "Computer Architecture for Establishing Dynamic Correlithm Object Communications in a Correlithm Object Processing System," U.S. Appl. No. 15/967,347, filed Apr. 30, 2018, 88 pages.
Lawrence, P. N., "Computer Architecture for Offline Node Remapping in a Cloud-Based Correlithm Object Processing System," U.S. Appl. No. 15/967,381, filed Apr. 30, 2018, 86 pages.
Meersman, R. et al., "On the Move to Meaningful Internet Systems 2005: CoopIS, DOA and ODBASE." OTM Confederated International Conferences CoopIS, DOA and ODBASE Oct. 2005 Agia Napa, Cyprus, Proceedings, Part I. Oct. 31-Nov. 4, 2005, pp. 763-779.
Lawrence, P. N., "Correlithm Object Technology," Apr. 2004, 229 pages.

* cited by examiner

COMPUTER ARCHITECTURE FOR COMMUNICATIONS IN A CLOUD-BASED CORRELITHM OBJECT PROCESSING SYSTEM

TECHNICAL FIELD

The present disclosure relates generally to computer architectures for emulating a processing system, and more specifically to computer architectures for emulating a correlithm object processing system.

BACKGROUND

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many security applications such as face recognition, voice recognition, and fraud detection.

Thus, it is desirable to provide a solution that allows computing systems to efficiently determine how similar different data samples are to each other and to perform operations based on their similarity.

SUMMARY

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many applications such as security application (e.g. face recognition, voice recognition, and fraud detection).

The system described in the present application provides a technical solution that enables the system to efficiently determine how similar different objects are to each other and to perform operations based on their similarity. In contrast to conventional systems, the system uses an unconventional configuration to perform various operations using categorical numbers and geometric objects, also referred to as correlithm objects, instead of ordinal numbers. Using categorical numbers and correlithm objects on a conventional device involves changing the traditional operation of the computer to support representing and manipulating concepts as correlithm objects. A device or system may be configured to implement or emulate a special purpose computing device capable of performing operations using correlithm objects. Implementing or emulating a correlithm object processing system improves the operation of a device by enabling the device to perform non-binary comparisons (i.e. match or no match) between different data samples. This enables the device to quantify a degree of similarity between different data samples. This increases the flexibility of the device to work with data samples having different data types and/or formats, and also increases the speed and performance of the device when performing operations using data samples. These technical advantages and other improvements to the device are described in more detail throughout the disclosure.

In one embodiment, the system is configured to use binary integers as categorical numbers rather than ordinal numbers which enables the system to determine how similar a data sample is to other data samples. Categorical numbers provide information about similar or dissimilar different data samples are from each other. For example, categorical numbers can be used in facial recognition applications to represent different images of faces and/or features of the faces. The system provides a technical advantage by allowing the system to assign correlithm objects represented by categorical numbers to different data samples based on how similar they are to other data samples. As an example, the system is able to assign correlithm objects to different images of people such that the correlithm objects can be directly used to determine how similar the people in the images are to each other. In other words, the system is able to use correlithm objects in facial recognition applications to quickly determine whether a captured image of a person matches any previously stored images without relying on conventional signal processing techniques. Correlithm object processing systems use new types of data structures called correlithm objects that improve the way a device operates, for example, by enabling the device to perform non-binary data set comparisons and to quantify the similarity between different data samples. Correlithm objects are data structures designed to improve the way a device stores, retrieves, and compares data samples in memory. Correlithm objects also provide a data structure that is independent of the data type and format of the data samples they represent. Correlithm objects allow data samples to be directly compared regardless of their original data type and/or format.

A correlithm object processing system uses a combination of a sensor table, a node table, and/or an actor table to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures.

In addition, correlithm object processing system uses a combination of a sensor table, a node table, and/or an actor table to provide a particular manner for transforming data samples between ordinal number representations and correlithm objects in a correlithm object domain. Transforming data samples between ordinal number representations and correlithm objects involves fundamentally changing the data type of data samples between an ordinal number system and a categorical number system to achieve the previously described benefits of the correlithm object processing system.

Using correlithm objects allows the system or device to compare data samples (e.g. images) even when the input data sample does not exactly match any known or previously stored input values. For example, an input data sample that is an image may have different lighting conditions than the previously stored images. The differences in lighting conditions can make images of the same person appear different from each other. The device uses an unconventional configuration that implements a correlithm object processing system that uses the distance between the data samples which are represented as correlithm objects and other known data samples to determine whether the input data sample matches or is similar to the other known data samples. Implementing a correlithm object processing system fundamentally changes the device and the traditional data processing paradigm. Implementing the correlithm object processing system improves the operation of the device by enabling the device to perform non-binary comparisons of data samples. In other words, the device is able to determine how similar the data samples are to each other even when the data samples are not exact matches. In addition, the device is able to quantify how similar data samples are to one another. The ability to determine how similar data samples are to each other is unique and distinct from conventional computers that can only perform binary comparisons to identify exact matches.

The problems associated with comparing data sets and identifying matches based on the comparison are problems necessarily rooted in computer technologies. As described above, conventional systems are limited to a binary comparison that can only determine whether an exact match is found. Emulating a correlithm object processing system provides a technical solution that addresses problems associated with comparing data sets and identifying matches. Using correlithm objects to represent data samples fundamentally changes the operation of a device and how the device views data samples. By implementing a correlithm object processing system, the device can determine the distance between the data samples and other known data samples to determine whether the input data sample matches or is similar to the other known data samples. In addition, the device is able to determine a degree of similarity that quantifies how similar different data samples are to one another.

Using correlithm objects to transmit data also provides several technical advantages over conventional systems that are not configured to use correlithm objects. Data transmitted over a network is vulnerable to attacks by bad actors trying to intercept the data. This vulnerability to unauthorized access to data is a technical problem inherent in any system communicating data over a network. The disclosed correlithm object processing system provides a technical solution to these problems associated with unauthorized data access. In a correlithm object processing system, real world data is obfuscated when its converted into correlithm objects. This obfuscation provides a level of encryption that protects the data from unauthorized access to the data. In the event that a bad actor obtains a correlithm object, the bad actor will be unable to recover the original real world data value without an appropriate conversion table (e.g. sensor table, node table, or actor table). A correlithm object processing system can leverage this property of correlithm objects to facilitate secure data communications with or without using a secure connection. In one example, data can be transmitted as correlithm objects using an unsecure connection. In this case, the data will appear obfuscated to anyone who intercepts the data. In this example, the encryption provided by using correlithm objects allows the data to be securely transmitted even though the connection is unsecure. As another example, data can be transmitted as correlithm objects using a secure connection. In this example, the encryption provided by using correlithm objects adds an addition layer of security for the data being transmitted. Thus, using a correlithm object processing system provides increased information security compared to conventional systems.

Another technical advantage provided by using correlithm objects to communicate data is their immunity to noise. Noise communication channels and bit errors are technical problems inherent to any digital computing system. In conventional systems, data becomes corrupt and unusable when bit errors occur. This means that when data is transmitted over a noisy channel, the receiving system may be unable to interpret the received data due to bit errors. In this example, the data may need to be retransmitted which introduces delays in the system. Resending the data may also require increasing the transmission power of the sending device to overcome the noisy channel, which consumes more resources. In contrast to these conventional systems, a correlithm object processing system provides a technical solution that is able to recover data even in the presence of bit errors. For example, when a correlithm object is received, the receiving device compares the received correlithm object to a set of stored correlithm objects and identifies the most similar correlithm object based on the number of similar bits. This means that the receiving device does not need to have an exact match in order to identify and interpret a received correlithm object. Conventional systems are unable to implement this feature. In conventional systems, each digital word has a unique value and a single bit error changes the value of the digital word. The noise immunity provided by using correlithm objects allows data to be transmitted even over noisy channels. When a bit error occurs, a receiving device is able to interpret and process the received data without having the data resent. This improves the operation of the system by increasing the throughput of the system and avoiding delays caused by resending data.

The level of noise immunity can be further increased by increasing the bit string length of the correlithm objects being transmitted. In other words, as the length of a correlithm object used by a correlithm object processing system increases, the correlithm object processing system becomes more immune to noise. This means that when a correlithm object processing system determines the quality of a communication channel is noise or poor, the correlithm object processing system can use longer correlithm objects to mitigate the effects of a noisy communication channel. Using longer correlithm objects simply increases the number of bits used to represent correlithm objects and does not change the baud rate or transmission rate being used to communicate the correlithm objects. This functionality is counter-intuitive to conventional systems. In conventional systems, when the bit error rate of channel becomes too high, the transmitting device typically reduces the transmission rate of the data being transmitted. In contrast to these systems, correlithm objects are able to continue communicating data without reducing the transmission rate, which provides further improved performance over conventional systems.

Another technical advantage of a correlithm object processing system is their ability to be adapted to implement a cloud based architecture that allows correlithm objects to be processed remotely as cloud services. For example, a device may send correlithm objects to a cloud based correlithm object processing system to offload the resources used for processing the correlithm objects. In this example, the device is able to receive processed correlithm objects from the cloud based correlithm object processing system without having to consume the device's processing resources. The cloud based correlithm object processing system allows devices to utilize the benefits of correlithm objects (e.g. noise immunity and information security) while offloading the computing resources.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

FIGS. 1-5 describe various embodiments of how a correlithm object processing system may be implemented or emulated in hardware, such as a special purpose computer.

Figure 1:
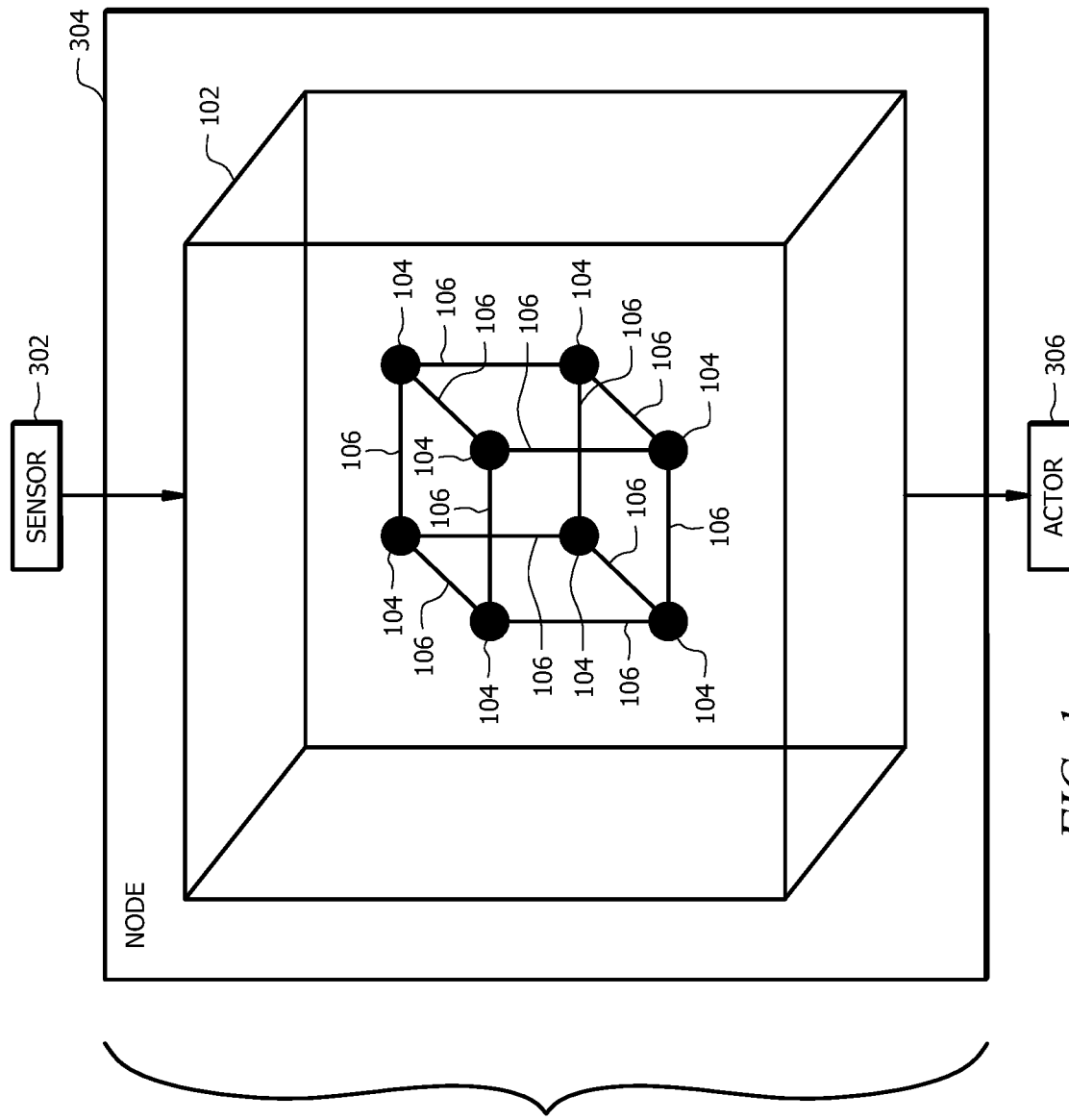
FIG. 1 is a schematic view of an embodiment of a special purpose computer implementing correlithm objects in an n-dimensional space.
Figure 1:
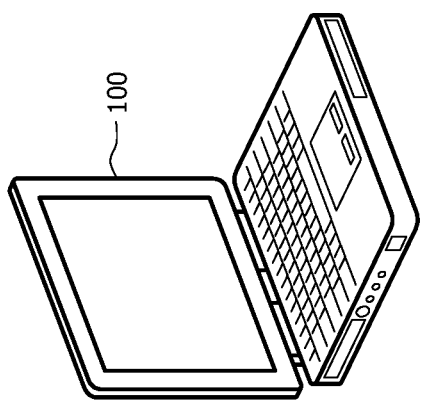

FIG. 1 is a schematic view of an embodiment of a user device 100 implementing correlithm objects 104 in an n-dimensional space 102. Examples of user devices 100 include, but are not limited to, desktop computers, mobile phones, tablet computers, laptop computers, or other special purpose computer platform. The user device 100 is configured to implement or emulate a correlithm object processing system that uses categorical numbers to represent data samples as correlithm objects 104 in a high-dimensional space 102, for example a high-dimensional binary cube.

Figure 3:
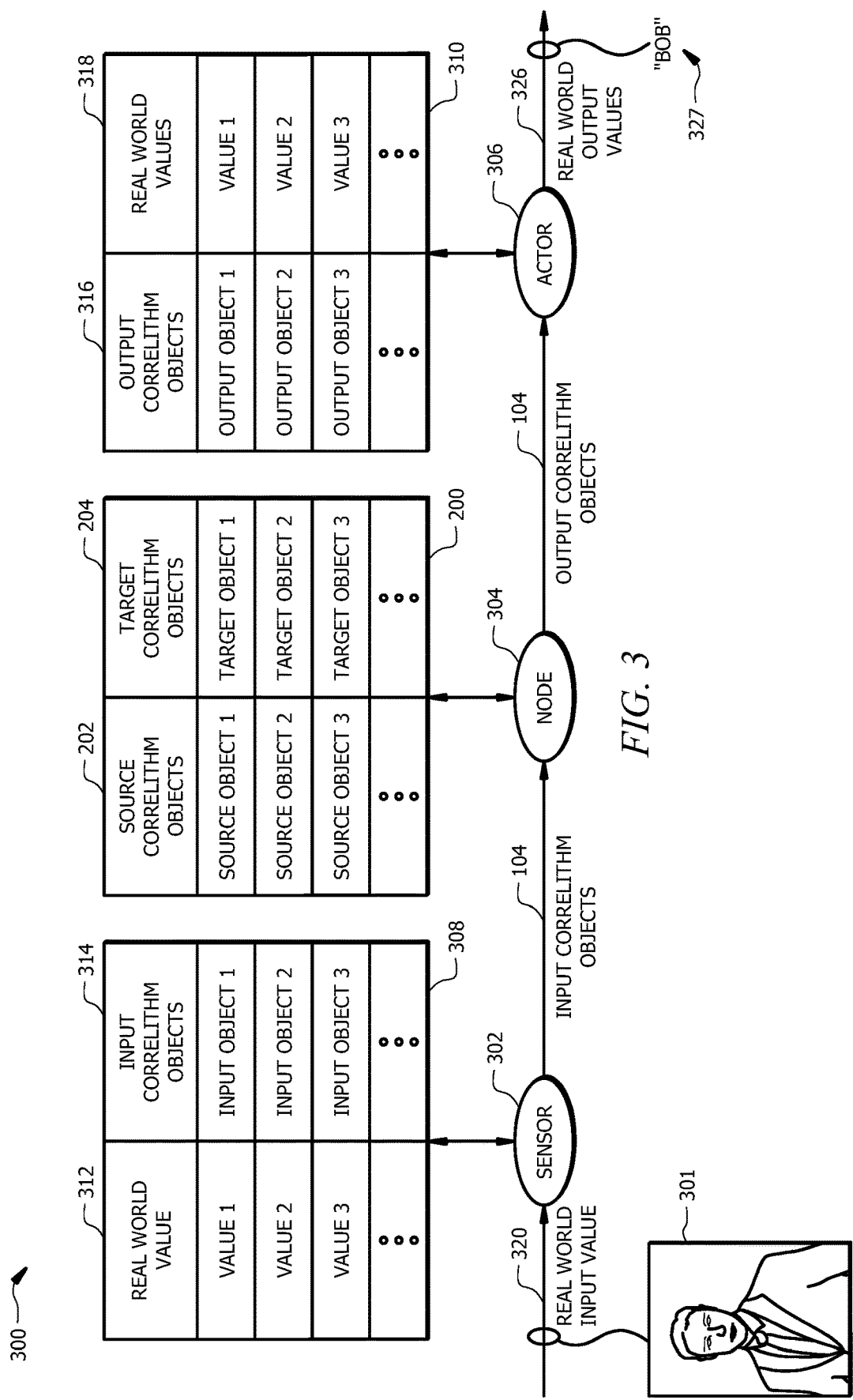
FIG. 3 is a schematic view of an embodiment of a correlithm object processing system.

Additional information about the correlithm object processing system is described in FIG. 3. Additional information about configuring the user device 100 to implement or emulate a correlithm object processing system is described in FIG. 5.

Conventional computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations. Ordinal based number systems only provide information about the sequence order of the numbers themselves based on their numeric values. Ordinal numbers do not provide any information about any other types of relationships for the data being represented by the numeric values, such as similarity. For example, when a conventional computer uses ordinal numbers to represent data samples (e.g. images or audio signals), different data samples are represented by different numeric values. The different numeric values do not provide any information about how similar or dissimilar one data sample is from another. In other words, conventional computers are only able to make binary comparisons of data samples which only results in determining whether the data samples match or do not match. Unless there is an exact match in ordinal number values, conventional systems are unable to tell if a data sample matches or is similar to any other data samples. As a result, conventional computers are unable to use ordinal numbers by themselves for determining similarity between different data samples, and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system.

In contrast to conventional systems, the user device 100 operates as a special purpose machine for implementing or emulating a correlithm object processing system. Implementing or emulating a correlithm object processing system improves the operation of the user device 100 by enabling the user device 100 to perform non-binary comparisons (i.e. match or no match) between different data samples. This enables the user device 100 to quantify a degree of similarity between different data samples. This increases the flexibility of the user device 100 to work with data samples having different data types and/or formats, and also increases the speed and performance of the user device 100 when performing operations using data samples. These improvements and other benefits to the user device 100 are described in more detail below and throughout the disclosure.

For example, the user device 100 employs the correlithm object processing system to allow the user device 100 to compare data samples even when the input data sample does not exactly match any known or previously stored input values. Implementing a correlithm object processing system fundamentally changes the user device 100 and the traditional data processing paradigm. Implementing the correlithm object processing system improves the operation of the user device 100 by enabling the user device 100 to perform non-binary comparisons of data samples. In other words, the user device 100 is able to determine how similar the data samples are to each other even when the data samples are not exact matches. In addition, the user device 100 is able to quantify how similar data samples are to one another. The ability to determine how similar data samples are to each others is unique and distinct from conventional computers that can only perform binary comparisons to identify exact matches.

The user device's 100 ability to perform non-binary comparisons of data samples also fundamentally changes traditional data searching paradigms. For example, conventional search engines rely on finding exact matches or exact partial matches of search tokens to identify related data samples. For instance, conventional text-based search engine are limited to finding related data samples that have text that exactly matches other data samples. These search engines only provide a binary result that identifies whether or not an exact match was found based on the search token. Implementing the correlithm object processing system improves the operation of the user device 100 by enabling the user device 100 to identify related data samples based on how similar the search token is to other data sample. These improvements result in increased flexibility and faster search time when using a correlithm object processing system. The ability to identify similarities between data samples expands the capabilities of a search engine to include data samples that may not have an exact match with a search token but are still related and similar in some aspects. The user device 100 is also able to quantify how similar data samples are to each other based on characteristics besides exact matches to the search token. Implementing the correlithm object processing system involves operating the user device 100 in an unconventional manner to achieve these technological improvements as well as other benefits described below for the user device 100.

Computing devices typically rely on the ability to compare data sets (e.g. data samples) to one another for processing. For example, in security or authentication applications a computing device is configured to compare an input of an unknown person to a data set of known people (or biometric information associated with these people). The problems associated with comparing data sets and identifying matches based on the comparison are problems necessarily rooted in computer technologies. As described above, conventional systems are limited to a binary comparison that can only determine whether an exact match is found. As an example, an input data sample that is an image of a person may have different lighting conditions than previously stored images. In this example, different lighting conditions can make images of the same person appear different from each other. Conventional computers are unable to distinguish between two images of the same person with different lighting conditions and two images of two different people without complicated signal processing. In both of these cases, conventional computers can only determine that the images are different. This is because conventional computers rely on manipulating ordinal numbers for processing.

In contrast, the user device 100 uses an unconventional configuration that uses correlithm objects to represent data samples. Using correlithm objects to represent data samples fundamentally changes the operation of the user device 100 and how the device views data samples. By implementing a correlithm object processing system, the user device 100 can determine the distance between the data samples and other known data samples to determine whether the input data sample matches or is similar to the other known data samples, as explained in detail below. Unlike the conventional computers described in the previous example, the user device 100 is able to distinguish between two images of the same person with different lighting conditions and two images of two different people by using correlithm objects 104. Correlithm objects allow the user device 100 to determine whether there are any similarities between data samples, such as between two images that are different from each other in some respects but similar in other respects. For example, the user device 100 is able to determine that despite different lighting conditions, the same person is present in both images.

In addition, the user device 100 is able to determine a degree of similarity that quantifies how similar different data samples are to one another. Implementing a correlithm object processing system in the user device 100 improves the operation of the user device 100 when comparing data sets and identifying matches by allowing the user device 100 to perform non-binary comparisons between data sets and to quantify the similarity between different data samples. In addition, using a correlithm object processing system results in increased flexibility and faster search times when comparing data samples or data sets. Thus, implementing a correlithm object processing system in the user device 100 provides a technical solution to a problem necessarily rooted in computer technologies.

The ability to implement a correlithm object processing system provides a technical advantage by allowing the system to identify and compare data samples regardless of whether an exact match has been previous observed or stored. In other words, using the correlithm object processing system the user device 100 is able to identify similar data samples to an input data sample in the absence of an exact match. This functionality is unique and distinct from conventional computers that can only identify data samples with exact matches.

Examples of data samples include, but are not limited to, images, files, text, audio signals, biometric signals, electric signals, or any other suitable type of data. A correlithm object 104 is a point in the n-dimensional space 102, sometimes called an "n-space." The value of represents the number of dimensions of the space. For example, an n-dimensional space 102 may be a 3-dimensional space, a 50-dimensional space, a 100-dimensional space, or any other suitable dimension space. The number of dimensions depends on its ability to support certain statistical tests, such as the distances between pairs of randomly chosen points in the space approximating a normal distribution. In some embodiments, increasing the number of dimensions in the n-dimensional space 102 modifies the statistical properties of the system to provide improved results. Increasing the number of dimensions increases the probability that a correlithm object 104 is similar to other adjacent correlithm objects 104. In other words, increasing the number of dimensions increases the correlation between how close a pair of correlithm objects 104 are to each other and how similar the correlithm objects 104 are to each other.

Correlithm object processing systems use new types of data structures called correlithm objects 104 that improve the way a device operates, for example, by enabling the device to perform non-binary data set comparisons and to quantify the similarity between different data samples. Correlithm objects 104 are data structures designed to improve the way a device stores, retrieves, and compares data samples in memory. Unlike conventional data structures, correlithm objects 104 are data structures where objects can be expressed in a high-dimensional space such that distance 106 between points in the space represent the similarity between different objects or data samples. In other words, the distance 106 between a pair of correlithm objects 104 in the n-dimensional space 102 indicates how similar the correlithm objects 104 are from each other and the data samples they represent. Correlithm objects 104 that are close to each other are more similar to each other than correlithm objects 104 that are further apart from each other. For example, in a facial recognition application, correlithm objects 104 used to represent images of different types of glasses may be relatively close to each other compared to correlithm objects 104 used to represent images of other features such as facial hair. An exact match between two data samples occurs when their corresponding correlithm objects 104 are the same or have no distance between them. When two data samples are not exact matches but are similar, the distance between their correlithm objects 104 can be used to indicate their similarities. In other words, the distance 106 between correlithm objects 104 can be used to identify both data samples that exactly match each other as well as data samples that do not match but are similar. This feature is unique to a correlithm processing system and is unlike conventional computers that are unable to detect when data samples are different but similar in some aspects.

Correlithm objects 104 also provide a data structure that is independent of the data type and format of the data samples they represent. Correlithm objects 104 allow data samples to be directly compared regardless of their original data type and/or format. In some instances, comparing data samples as correlithm objects 104 is computationally more efficient and faster than comparing data samples in their original format. For example, comparing images using conventional data structures involves significant amounts of image processing which is time consuming and consumes processing resources. Thus, using correlithm objects 104 to represent data samples provides increased flexibility and improved performance compared to using other conventional data structures.

In one embodiment, correlithm objects 104 may be represented using categorical binary strings. The number of bits used to represent the correlithm object 104 corresponds with the number of dimensions of the n-dimensional space 102 where the correlithm object 102 is located. For example, each correlithm object 104 may be uniquely identified using a 64-bit string in a 64-dimensional space 102. As another example, each correlithm object 104 may be uniquely identified using a 10-bit string in a 10-dimensional space 102. In other examples, correlithm objects 104 can be identified using any other suitable number of bits in a string that corresponds with the number of dimensions in the n-dimensional space 102.

In this configuration, the distance 106 between two correlithm objects 104 can be determined based on the differences between the bits of the two correlithm objects 104. In other words, the distance 106 between two correlithm objects can be determined based on how many individual bits differ between the correlithm objects 104. The distance 106 between two correlithm objects 104 can be computed using Hamming distance or any other suitable technique.

As an example using a 10-dimensional space 102, a first correlithm object 104 is represented by a first 10-bit string (1001011011) and a second correlithm object 104 is represented by a second 10-bit string (1000011011). The Hamming distance corresponds with the number of bits that differ between the first correlithm object 104 and the second correlithm object 104. In other words, the Hamming distance between the first correlithm object 104 and the second correlithm object 104 can be computed as follows:

1001011011
1000011011
- - -
0001000000

In this example, the Hamming distance is equal to one because only one bit differs between the first correlithm object 104 and the second correlithm object. As another example, a third correlithm object 104 is represented by a third 10-bit string (0110100100). In this example, the Hamming distance between the first correlithm object 104 and the third correlithm object 104 can be computed as follows:

1001011011
0110100100
- - -
1111111111

The Hamming distance is equal to ten because all of the bits are different between the first correlithm object 104 and the third correlithm object 104. In the previous example, a Hamming distance equal to one indicates that the first correlithm object 104 and the second correlithm object 104 are close to each other in the n-dimensional space 102, which means they are similar to each other. In the second example, a Hamming distance equal to ten indicates that the first correlithm object 104 and the third correlithm object 104 are further from each other in the n-dimensional space 102 and are less similar to each other than the first correlithm object 104 and the second correlithm object 104. In other words, the similarity between a pair of correlithm objects can be readily determined based on the distance between the pair correlithm objects.

As another example, the distance between a pair of correlithm objects 104 can be determined by performing an XOR operation between the pair of correlithm objects 104 and counting the number of logical high values in the binary string. The number of logical high values indicates the number of bits that are different between the pair of correlithm objects 104 which also corresponds with the Hamming distance between the pair of correlithm objects 104.

In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

The user device 100 is configured to implement or emulate a correlithm object processing system that comprises one or more sensors 302, nodes 304, and/or actors 306 in order to convert data samples between real world values or representations and to correlithm objects 104 in a correlithm object domain. Sensors 302 are generally configured to convert real world data samples to the correlithm object domain. Nodes 304 are generally configured to process or perform various operations on correlithm objects in the correlithm object domain. Actors 306 are generally configured to convert correlithm objects 104 into real world values or representations. Additional information about sensors 302, nodes 304, and actors 306 is described in FIG. 3.

Performing operations using correlithm objects 104 in a correlithm object domain allows the user device 100 to identify relationships between data samples that cannot be identified using conventional data processing systems. For example, in the correlithm object domain, the user device 100 is able to identify not only data samples that exactly match an input data sample, but also other data samples that have similar characteristics or features as the input data samples. Conventional computers are unable to identify these types of relationships readily. Using correlithm objects 104 improves the operation of the user device 100 by enabling the user device 100 to efficiently process data samples and identify relationships between data samples without relying on signal processing techniques that require a significant amount of processing resources. These benefits allow the user device 100 to operate more efficiently than conventional computers by reducing the amount of processing power and resources that are needed to perform various operations.

Figure 2:
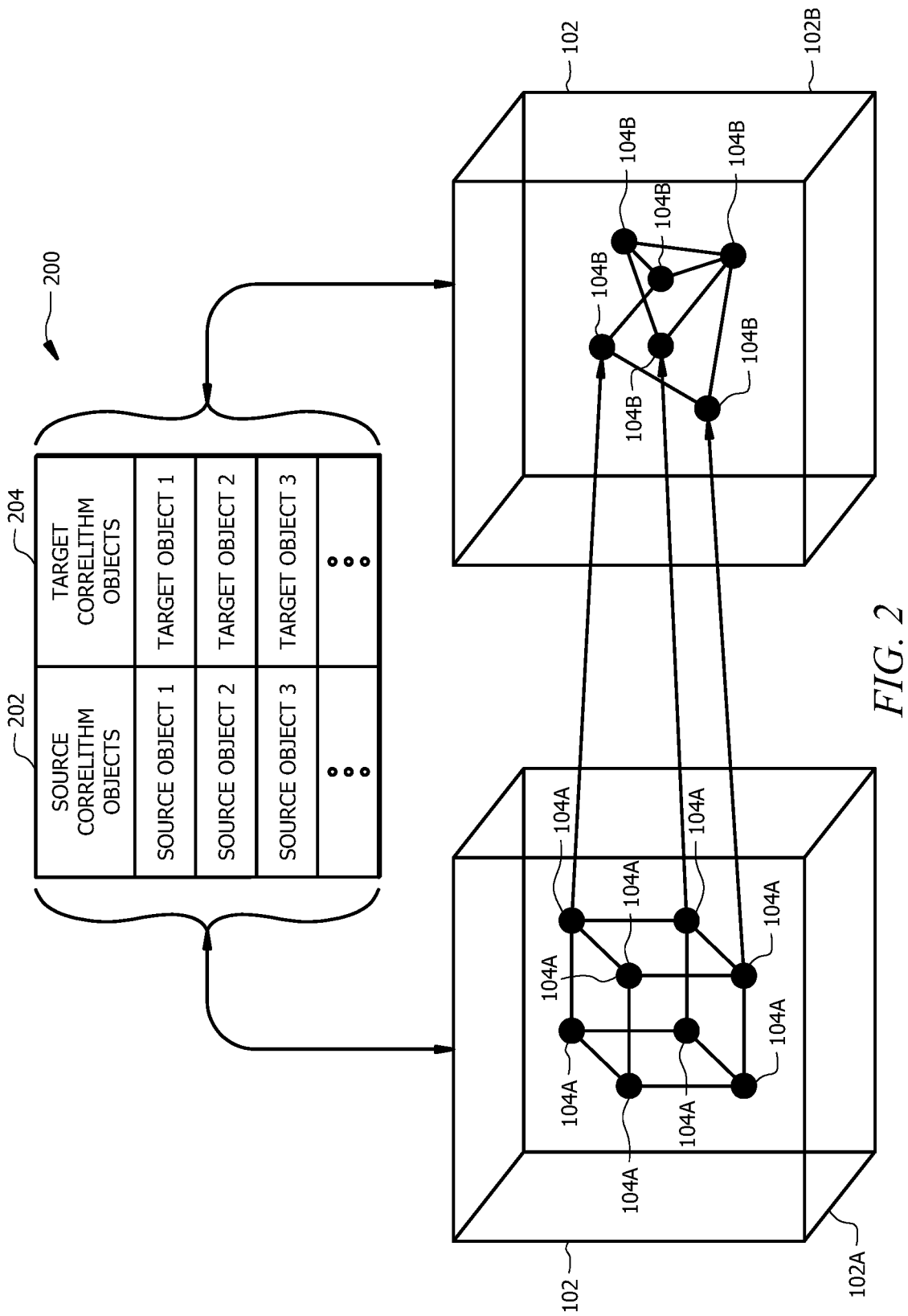
FIG. 2 is a perspective view of an embodiment of a mapping between correlithm objects in different n-dimensional spaces.

FIG. 2 is a schematic view of an embodiment of a mapping between correlithm objects 104 in different n-dimensional spaces 102. When implementing a correlithm object processing system, the user device 100 performs operations within the correlithm object domain using correlithm objects 104 in different n-dimensional spaces 102. As an example, the user device 100 may convert different types of data samples having real world values into correlithm objects 104 in different n-dimensional spaces 102. For instance, the user device 100 may convert data samples of text into a first set of correlithm objects 104 in a first n-dimensional space 102 and data samples of audio samples as a second set of correlithm objects 104 in a second n-dimensional space 102. Conventional systems require data samples to be of the same type and/or format in order to perform any kind of operation on the data samples. In some instances, some types of data samples cannot be compared because there is no common format available. For example, conventional computers are unable to compare data samples of images and data samples of audio samples because there is no common format. In contrast, the user device 100 implementing a correlithm object processing system is able to compare and perform operations using correlithm objects 104 in the correlithm object domain regardless of the type or format of the original data samples.

In FIG. 2, a first set of correlithm objects 104A are defined within a first n-dimensional space 102A and a second set of correlithm objects 104B are defined within a second n-dimensional space 102B. The n-dimensional spaces may have the same number of dimensions or a different number of dimensions. For example, the first n-dimensional space 102A and the second n-dimensional space 102B may both be three dimensional spaces. As another example, the first n-dimensional space 102A may be a three-dimensional space and the second n-dimensional space 102B may be a nine dimensional space. Correlithm objects 104 in the first n-dimensional space 102A and second n-dimensional space 102B are mapped to each other. In other words, a correlithm object 104A in the first n-dimensional space 102A may reference or be linked with a particular correlithm object 104B in the second n-dimensional space 102B. The correlithm objects 104 may also be linked with and referenced with other correlithm objects 104 in other n-dimensional spaces 102.

In one embodiment, a data structure such as table 200 may be used to map or link correlithm objects 104 in different n-dimensional spaces 102. In some instances, table 200 is referred to as a node table. Table 200 is generally configured to identify a first plurality of correlithm objects 104 in a first n-dimensional space 102 and a second plurality of correlithm objects 104 in a second n-dimensional space 102. Each correlithm object 104 in the first n-dimensional space 102 is linked with a correlithm object 104 is the second n-dimensional space 102. For example, table 200 may be configured with a first column 202 that lists correlithm objects 104A as source correlithm objects and a second column 204 that lists corresponding correlithm objects 104B as target correlithm objects. In other examples, table 200 may be configured in any other suitable manner or may be implemented using any other suitable data structure. In some embodiments, one or more mapping functions may be used to convert between a correlithm object 104 in a first n-dimensional space and a correlithm object 104 is a second n-dimensional space.

FIG. 3 is a schematic view of an embodiment of a correlithm object processing system 300 that is implemented by a user device 100 to perform operations using correlithm objects 104. The system 300 generally comprises a sensor 302, a node 304, and an actor 306. The system 300 may be configured with any suitable number and/or configuration of sensors 302, nodes 304, and actors 306. An example of the system 300 in operation is described in FIG. 4. In one embodiment, a sensor 302, a node 304, and an actor 306 may all be implemented on the same device (e.g. user device 100). In other embodiments, a sensor 302, a node 304, and an actor 306 may each be implemented on different devices in signal communication with each other for example over a network. In other embodiments, different devices may be configured to implement any combination of sensors 302, nodes 304, and actors 306.

Sensors 302 serve as interfaces that allow a user device 100 to convert real world data samples into correlithm objects 104 that can be used in the correlithm object domain. Sensors 302 enable the user device 100 to compare and perform operations using correlithm objects 104 regardless of the data type or format of the original data sample. Sensors 302 are configured to receive a real world value 320 representing a data sample as an input, to determine a correlithm object 104 based on the real world value 320, and to output the correlithm object 104. For example, the sensor 302 may receive an image 301 of a person and output a correlithm object 322 to the node 304 or actor 306. In one embodiment, sensors 302 are configured to use sensor tables 308 that link a plurality of real world values with a plurality of correlithm objects 104 in an n-dimensional space 102. Real world values are any type of signal, value, or representation of data samples. Examples of real world values include, but are not limited to, images, pixel values, text, audio signals, electrical signals, and biometric signals. As an example, a sensor table 308 may be configured with a first column 312 that lists real world value entries corresponding with different images and a second column 314 that lists corresponding correlithm objects 104 as input correlithm objects. In other examples, sensor tables 308 may be configured in any other suitable manner or may be implemented using any other suitable data structure. In some embodiments, one or more mapping functions may be used to translate between a real world value 320 and a correlithm object 104 in an n-dimensional space. Additional information for implementing or emulating a sensor 302 in hardware is described in FIG. 5.

Nodes 304 are configured to receive a correlithm object 104 (e.g. an input correlithm object 104), to determine another correlithm object 104 based on the received correlithm object 104, and to output the identified correlithm object 104 (e.g. an output correlithm object 104). In one embodiment, nodes 304 are configured to use node tables 200 that link a plurality of correlithm objects 104 from a first n-dimensional space 102 with a plurality of correlithm objects 104 in a second n-dimensional space 102. A node table 200 may be configured similar to the table 200 described in FIG. 2. Additional information for implementing or emulating a node 304 in hardware is described in FIG. 5.

Actors 306 serve as interfaces that allow a user device 100 to convert correlithm objects 104 in the correlithm object domain back to real world values or data samples. Actors 306 enable the user device 100 to convert from correlithm objects 104 into any suitable type of real world value. Actors 306 are configured to receive a correlithm object 104 (e.g. an output correlithm object 104), to determine a real world output value 326 based on the received correlithm object 104, and to output the real world output value 326. The real world output value 326 may be a different data type or representation of the original data sample. As an example, the real world input value 320 may be an image 301 of a person and the resulting real world output value 326 may be text 327 and/or an audio signal identifying the person. In one embodiment, actors 306 are configured to use actor tables 310 that link a plurality of correlithm objects 104 in an n-dimensional space 102 with a plurality of real world values. As an example, an actor table 310 may be configured with a first column 316 that lists correlithm objects 104 as output correlithm objects and a second column 318 that lists real world values. In other examples, actor tables 310 may be configured in any other suitable manner or may be implemented using any other suitable data structure. In some embodiments, one or more mapping functions may be employed to translate between a correlithm object 104 in an n-dimensional space and a real world output value 326. Additional information for implementing or emulating an actor 306 in hardware is described in FIG. 5.

A correlithm object processing system 300 uses a combination of a sensor table 308, a node table 200, and/or an actor table 310 to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures. Conventional systems require data samples to be of the same type and/or format in order to perform any kind of operation on the data samples. In some instances, some types of data samples are incompatible with each other and cannot be compared because there is no common format available. For example, conventional computers are unable to compare data samples of images with data samples of audio samples because there is no common format available. In contrast, a device implementing a correlithm object processing system uses a combination of a sensor table 308, a node table 200, and/or an actor table 310 to compare and perform operations using correlithm objects 104 in the correlithm object domain regardless of the type or format of the original data samples. The correlithm object processing system 300 uses a combination of a sensor table 308, a node table 200, and/or an actor table 310 as a specific set of rules that provides a particular solution to dealing with different types of data samples and allows devices to perform operations on different types of data samples using correlithm objects 104 in the correlithm object domain. In some instances, comparing data samples as correlithm objects 104 is computationally more efficient and faster than comparing data samples in their original format. Thus, using correlithm objects 104 to represent data samples provides increased flexibility and improved performance compared to using other conventional data structures. The specific set of rules used by the correlithm object processing system 300 go beyond simply using routine and conventional activities in order to achieve this new functionality and performance improvements.

In addition, correlithm object processing system 300 uses a combination of a sensor table 308, a node table 200, and/or an actor table 310 to provide a particular manner for transforming data samples between ordinal number representations and correlithm objects 104 in a correlithm object domain. For example, the correlithm object processing system 300 may be configured to transform a representation of a data sample into a correlithm object 104, to perform various operations using the correlithm object 104 in the correlithm object domain, and to transform a resulting correlithm object 104 into another representation of a data sample. Transforming data samples between ordinal number representations and correlithm objects 104 involves fundamentally changing the data type of data samples between an ordinal number system and a categorical number system to achieve the previously described benefits of the correlithm object processing system 300.

Figure 4:
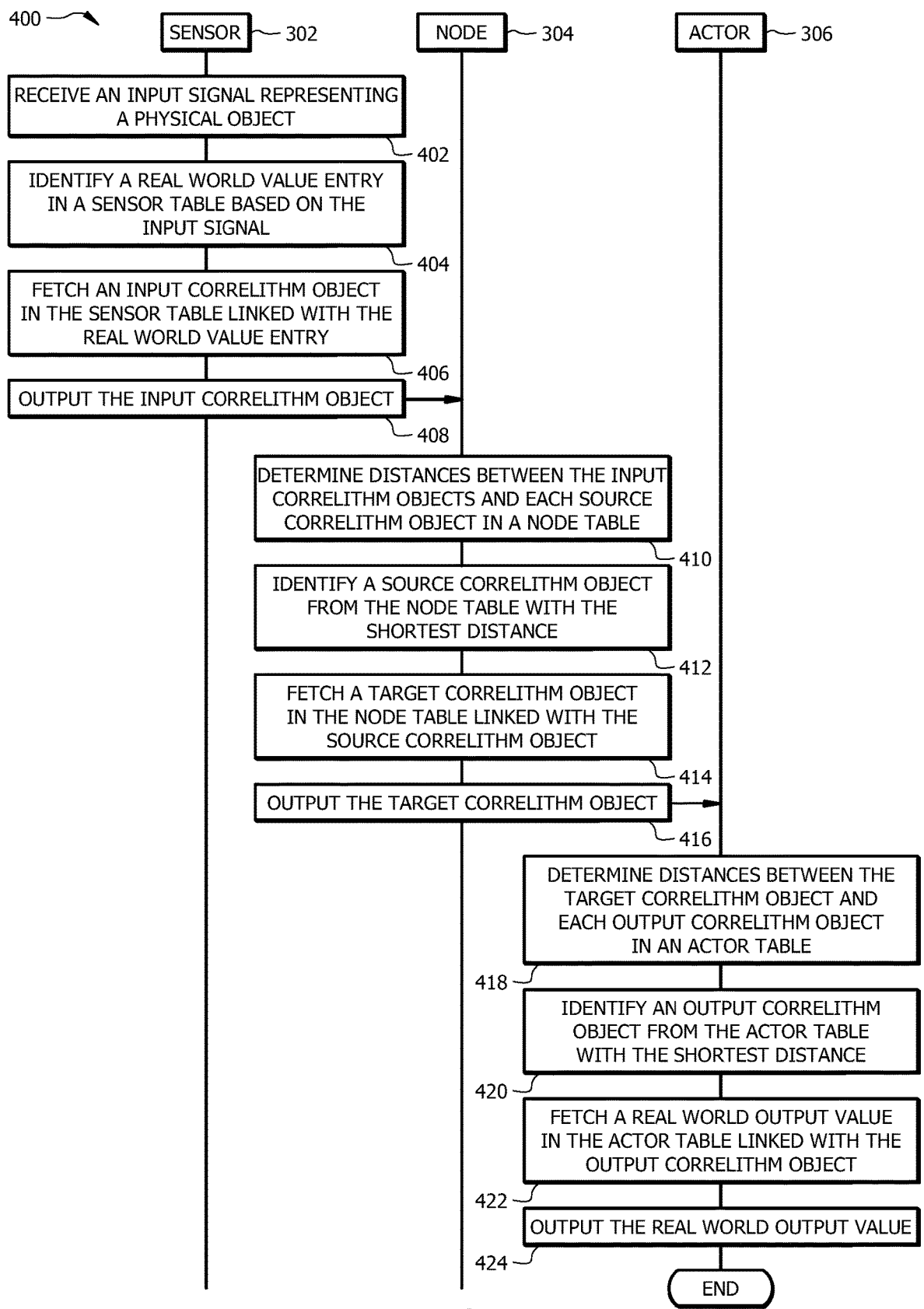
FIG. 4 is a protocol diagram of an embodiment of a correlithm object process flow.

FIG. 4 is a protocol diagram of an embodiment of a correlithm object process flow 400. A user device 100 implements process flow 400 to emulate a correlithm object processing system 300 to perform operations using correlithm object 104 such as facial recognition. The user device 100 implements process flow 400 to compare different data samples (e.g. images, voice signals, or text) to each other and to identify other objects based on the comparison. Process flow 400 provides instructions that allows user devices 100 to achieve the improved technical benefits of a correlithm object processing system 300.

Conventional systems are configured to use ordinal numbers for identifying different data samples. Ordinal based number systems only provide information about the sequence order of numbers based on their numeric values, and do not provide any information about any other types of relationships for the data samples being represented by the numeric values such as similarity. In contrast, a user device 100 can implement or emulate the correlithm object processing system 300 which provides an unconventional solution that uses categorical numbers and correlithm objects 104 to represent data samples. For example, the system 300 may be configured to use binary integers as categorical numbers to generate correlithm objects 104 which enables the user device 100 to perform operations directly based on similarities between different data samples. Categorical numbers provide information about how similar different data sample are from each other. Correlithm objects 104 generated using categorical numbers can be used directly by the system 300 for determining how similar different data samples are from each other without relying on exact matches, having a common data type or format, or conventional signal processing techniques.

A non-limiting example is provided to illustrate how the user device 100 implements process flow 400 to emulate a correlithm object processing system 300 to perform facial recognition on an image to determine the identity of the person in the image. In other examples, the user device 100 may implement process flow 400 to emulate a correlithm object processing system 300 to perform voice recognition, text recognition, or any other operation that compares different objects.

At step 402, a sensor 302 receives an input signal representing a data sample. For example, the sensor 302 receives an image of person's face as a real world input value 320. The input signal may be in any suitable data type or format. In one embodiment, the sensor 302 may obtain the input signal in real-time from a peripheral device (e.g. a camera). In another embodiment, the sensor 302 may obtain the input signal from a memory or database.

At step 404, the sensor 302 identifies a real world value entry in a sensor table 308 based on the input signal. In one embodiment, the system 300 identifies a real world value entry in the sensor table 308 that matches the input signal. For example, the real world value entries may comprise previously stored images. The sensor 302 may compare the received image to the previously stored images to identify a real world value entry that matches the received image. In one embodiment, when the sensor 302 does not find an exact match, the sensor 302 finds a real world value entry that closest matches the received image.

At step 406, the sensor 302 identifies and fetches an input correlithm object 104 in the sensor table 308 linked with the real world value entry. At step 408, the sensor 302 sends the identified input correlithm object 104 to the node 304. In one embodiment, the identified input correlithm object 104 is represented in the sensor table 308 using a categorical binary integer string. The sensor 302 sends the binary string representing to the identified input correlithm object 104 to the node 304.

At step 410, the node 304 receives the input correlithm object 104 and determines distances 106 between the input correlithm object 104 and each source correlithm object 104 in a node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using Hamming distance or any other suitable technique. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension. At step 412, the node 304 identifies a source correlithm object 104 from the node table 200 with the shortest distance 106. A source correlithm object 104 with the shortest distance from the input correlithm object 104 is a correlithm object 104 either matches or most closely matches the received input correlithm object 104.

At step 414, the node 304 identifies and fetches a target correlithm object 104 in the node table 200 linked with the source correlithm object 104. At step 416, the node 304 outputs the identified target correlithm object 104 to the actor 306. In this example, the identified target correlithm object 104 is represented in the node table 200 using a categorical binary integer string. The node 304 sends the binary string representing to the identified target correlithm object 104 to the actor 306.

At step 418, the actor 306 receives the target correlithm object 104 and determines distances between the target correlithm object 104 and each output correlithm object 104 in an actor table 310. The actor 306 may compute the distances between the target correlithm object 104 and each output correlithm object 104 in an actor table 310 using a process similar to the process described in step 410.

At step 420, the actor 306 identifies an output correlithm object 104 from the actor table 310 with the shortest distance 106. An output correlithm object 104 with the shortest distance from the target correlithm object 104 is a correlithm object 104 either matches or most closely matches the received target correlithm object 104.

At step 422, the actor 306 identifies and fetches a real world output value in the actor table 310 linked with the output correlithm object 104. The real world output value may be any suitable type of data sample that corresponds with the original input signal. For example, the real world output value may be text that indicates the name of the person in the image or some other identifier associated with the person in the image. As another example, the real world output value may be an audio signal or sample of the name of the person in the image. In other examples, the real world output value may be any other suitable real world signal or value that corresponds with the original input signal. The real world output value may be in any suitable data type or format.

At step 424, the actor 306 outputs the identified real world output value. In one embodiment, the actor 306 may output the real world output value in real-time to a peripheral device (e.g. a display or a speaker). In one embodiment, the actor 306 may output the real world output value to a memory or database. In one embodiment, the real world output value is sent to another sensor 302. For example, the real world output value may be sent to another sensor 302 as an input for another process.

Figure 5:
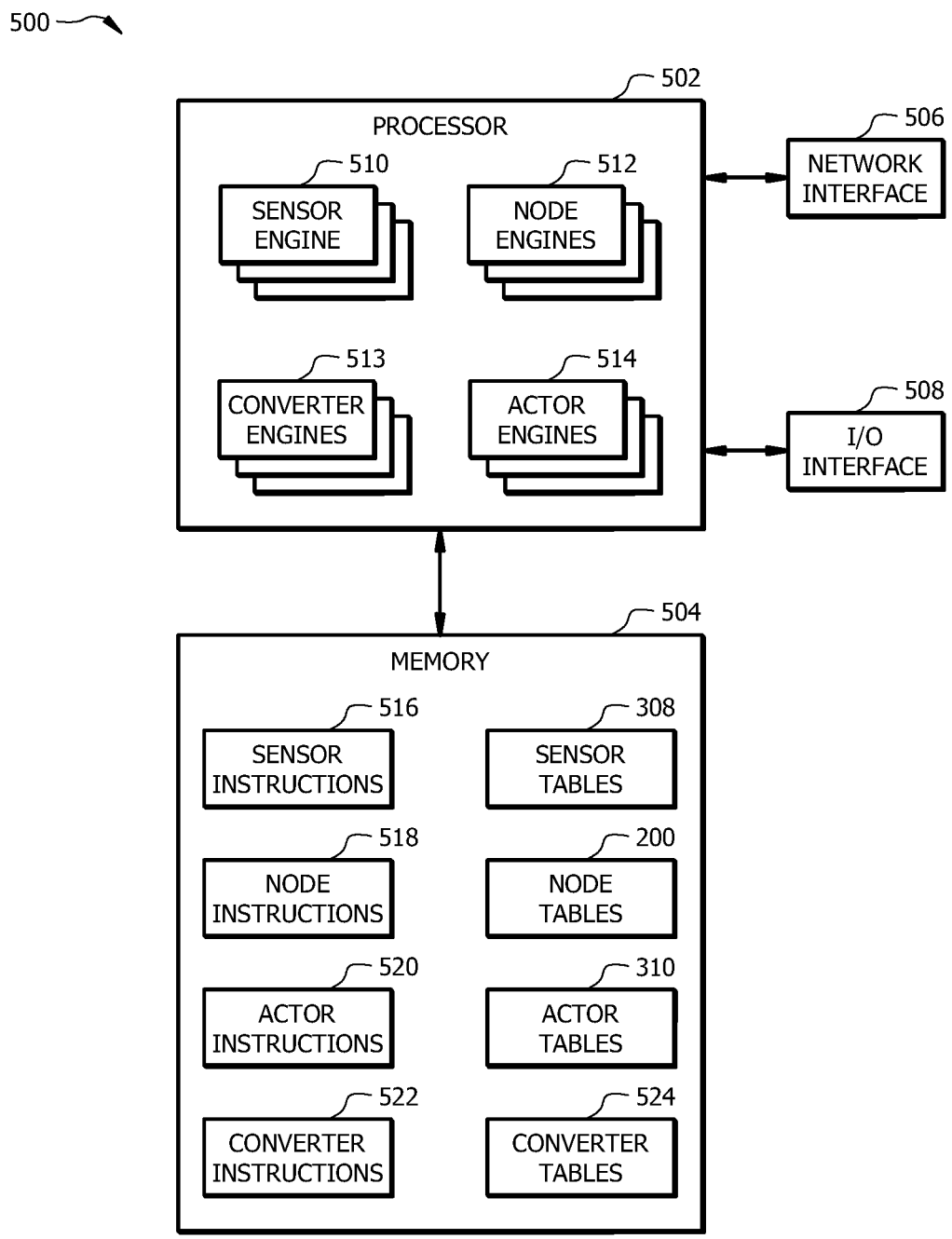
FIG. 5 is a schematic diagram of an embodiment a computer architecture for emulating a correlithm object processing system.

FIG. 5 is a schematic diagram of an embodiment of a computer architecture 500 for emulating a correlithm object processing system 300 in a user device 100. The computer architecture 500 comprises a processor 502, a memory 504, a network interface 506, and an input-output (I/O) interface 508. The computer architecture 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), graphics processing units (GPUs), or digital signal processors (DSPs). The processor 502 may be a programmable logic device, a microcontroller, a microprocessor, or any suitable combination of the preceding. The processor 502 is communicatively coupled to and in signal communication with the memory 204. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement sensor engines 510, node engines 512, converter engines 513, and actor engines 514. In an embodiment, the sensor engines 510, the node engines 512, and the actor engines 514 are implemented using logic units, FPGAs, ASICs, DSPs, or any other suitable hardware. The sensor engines 510, the node engines 512, converter engines 513, and the actor engines 514 are each configured to implement a specific set of rules or process that provides an improved technological result.

In one embodiment, the sensor engine 510 is configured to receive a real world value 320 as an input, to determine a correlithm object 104 based on the real world value 320, and to output the correlithm object 104. Examples of the sensor engine 510 in operation are described in FIGS. 4, 6, and 7.

In one embodiment, the node engine 512 is configured to receive a correlithm object 104 (e.g. an input correlithm object 104), to determine another correlithm object 104 based on the received correlithm object 104, and to output the identified correlithm object 104 (e.g. an output correlithm object 104). The node engine 512 is also configured to compute distances between pairs of correlithm objects 104. Examples of the node engine 512 in operation are described in FIGS. 4 and 10-17.

In one embodiment, the actor engine 514 is configured to receive a correlithm object 104 (e.g. an output correlithm object 104), to determine a real world output value 326 based on the received correlithm object 104, and to output the real world output value 326. Examples of the actor engine 514 in operation are described in FIGS. 4, 6, and 7.

In one embodiment, the converter engine 513 is configured to combine the functionality of the sensor engine 510 and the actor engine 514. An example of the converter engine 513 in operation is described in FIG. 9.

The memory 504 comprises one or more non-transitory disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store sensor instructions 516, node instructions 518, actor instructions 520, converter instructions 522, converter tables 524, sensor tables 308, node tables 200, actor tables 310, and/or any other data or instructions. The sensor instructions 516, the node instructions 518, converter instructions 513, and the actor instructions 520 comprise any suitable set of instructions, logic, rules, or code operable to execute the sensor engine 510, node engine 512, converter engine 513, and the actor engine 514, respectively.

The sensor tables 308, the node tables 200, and the actor tables 310 may be configured similar to the sensor tables 308, the node tables 200, and the actor tables 310 described in FIG. 3, respectively. The converter table 524 is configured as a hybrid combination of the previously described sensor table 308 and actor table 310. An example of the converter table 524 is described in FIG. 9.

The network interface 506 is configured to enable wired and/or wireless communications. The network interface 506 is configured to communicate data with any other device or system. For example, the network interface 506 may be configured for communication with a modem, a switch, a router, a bridge, a server, or a client. The processor 502 is configured to send and receive data using the network interface 506.

The I/O interface 508 may comprise ports, transmitters, receivers, transceivers, or any other devices for transmitting and/or receiving data with peripheral devices as would be appreciated by one of ordinary skill in the art upon viewing this disclosure. For example, the I/O interface 508 may be configured to communicate data between the processor 502 and peripheral hardware such as a graphical user interface, a display, a mouse, a keyboard, a key pad, and a touch sensor (e.g. a touch screen).

Figure 6:
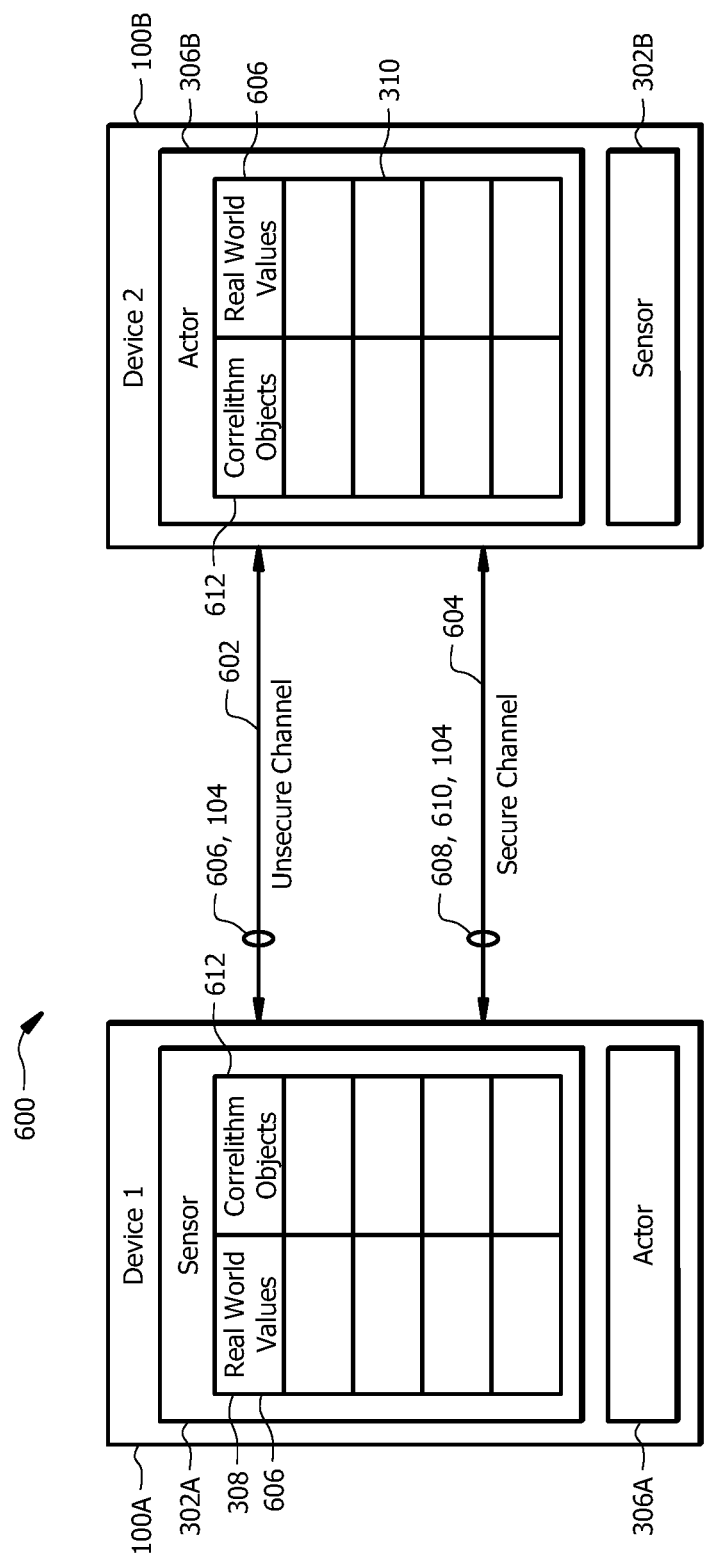
FIG. 6 is a schematic diagram of an embodiment of a computer architecture for establishing encrypted data communications in a correlithm object processing system.
Figure 7:
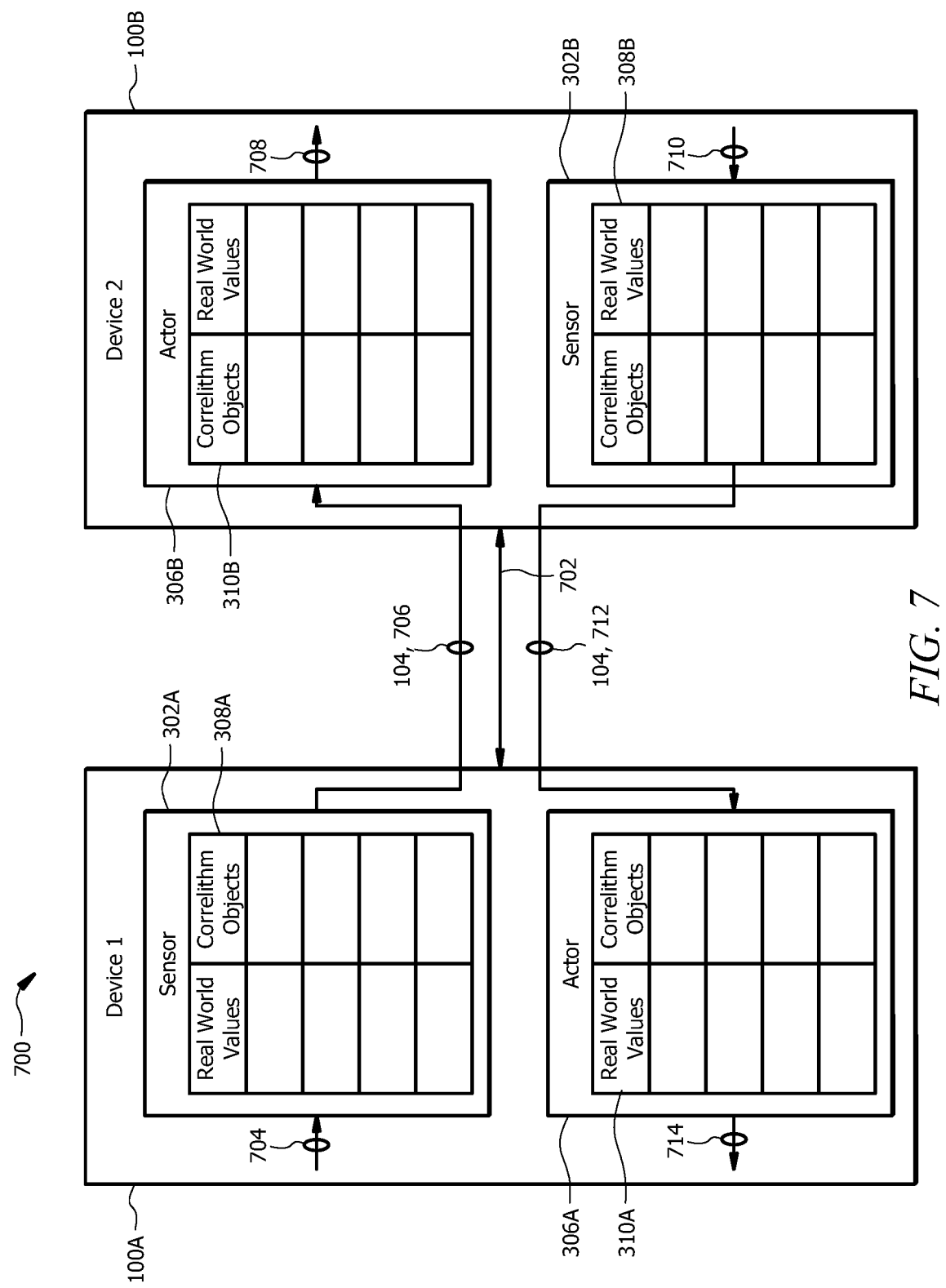
FIG. 7 is a schematic diagram of an embodiment of two devices configured to employ encrypted data communication using a correlithm object processing system.

Using correlithm objects 104 to transmit data provides several technical advantages over conventional systems that are not configured to use correlithm objects 104. In a correlithm object processing system, real world data is obfuscated when its converted into correlithm objects 104. This obfuscation provides a level of encryption that protects the data from unauthorized access to the data. In the event that a bad actor obtains a correlithm object 104, the bad actor will be unable to recover the original real world data value without an appropriate conversion table (e.g. sensor table 308, node table 200, or actor table 310). A correlithm object processing system can leverage this property of correlithm objects 104 to facilitate secure data communications with or without using a secure connection. In one example, data can be transmitted as correlithm objects 104 using an unsecure connection. In this example, the encryption provided by using correlithm objects 104 allows the data to be securely transmitted even though the connection is unsecure. In this case, the data will appear obfuscated to anyone who intercepts the data. As another example, data can be transmitted as correlithm objects 104 using a secure connection. In this example, the encryption provided by using correlithm objects 104 adds an addition layer of security for the data being transmitted. Thus, using a correlithm object processing system provides increased information security compared to conventional systems. FIG. 6 provides an example of a process for establishing encrypted communications using correlithm objects 104 and FIG. 7 provides an example of a process for communicating between different devices using correlithm objects 104.

Another technical advantage provided by using correlithm objects 104 to communicate data is their noise immunity. Noisy communication channels and bit errors are technical problems inherent to any digital computing system. In conventional systems, data becomes corrupt and unusable when bit errors occur. This means that when data is transmitted over a noisy channel, the receiving system may be unable to interpret the received data due to bit errors. In this example, the data may need to be retransmitted which introduces delays in the system. Resending the data may also require increasing the transmission power of the sending device to overcome the noisy channel, which consumes more resources. In contrast to these conventional systems, a correlithm object processing system provides a technical solution that is able to recover data even in the presence of bit errors. For example, when a correlithm object is received, the receiving device compares the received correlithm object to a set of stored correlithm objects and identifies the most similar correlithm object based on the number of similar bits. This means that the receiving device does not need to have an exact match in order to identify and interpret a received correlithm object. Conventional systems are unable to implement this feature. In conventional systems, each digital word has a unique value and a single bit error changes the value of the digital word. The noise immunity provided by using correlithm objects 104 allows data to be transmitted even over noisy channels. When a bit error occurs, a receiving device is able to interpret and process the received data without having the data resent. This improves the operation of the system by increasing the throughput of the system and avoiding delays caused by resending data.

FIG. 6 is a schematic diagram of an embodiment of a computer architecture for establishing encrypted data communications in a correlithm object processing system 600. In FIG. 6, the computer architecture comprises a first device 100A in signal communication with a second device 100B. The first device 100A and the second device 100B are configured to work cooperatively to establish communications between the first device 100A and the second device 100B using correlithm objects 104. The first device 100A and the second device 100B are in signal communication with each other using any suitable type of wired or wireless connection. For example, the first device 100A and the second device 100B may be signal communication with each other over a network connection. In one embodiment, the first device 100A and the second device 100B are configured to use an unsecure channel 602 and a secure channel 604 to communicate with each other. The secure channel 604 is an encrypted or protected channel and the unsecure channel 604 is an unencrypted or unprotected channel. The secure channel 604 may be configured to use any suitable type of encryption or security protocol as would be appreciated by one of ordinary skill in the art.

The first device 100A is configured to input a set of real world values 606 and a correlithm object key 608 into a correlithm object algorithm 610 to generate a set of correlithm objects 612. Each correlithm object 104 in the set of correlithm objects 612 is an n-bit digital word of binary value. In one embodiment, the correlithm object algorithm 610 is configured to use a correlithm object key 608 and real world values as inputs. The correlithm object key 608 may be any suitable type of encryption or encoding key. In this example, the correlithm object algorithm 610 generates a unique correlithm object output based on the combination of the correlithm object key 608 and a real world value input.

In one embodiment, the first device 100A is configured to link the set of real world values 606 with corresponding correlithm objects 104 in the generated set of correlithm objects 612 to generate a sensor table 308. The first device 100A may be further configured to shuffle the order of the real world value and correlithm object pairs in the sensor table 308 after generating the sensor table 308. Shuffling the order of the real world value and correlithm object pairs in the sensor table 308 changes the locations of the pairs within the sensor table 308, but does not change the association between a real world value its corresponding correlithm object 104. The first device 100A is further configured to link a sensor 302A with the sensor table 308.

In one embodiment, the first device 100A is also configured to link the set of real world values 606 and the generated set of correlithm objects 612 to generate an actor table 310. The first device 100A may also be configured to shuffle the order of the real world value and correlithm object pairs in the actor table 310 after generating the actor table 310. The first device 100A is further configured to link an actor 306A with the generated actor table 310.

In some embodiments, the first device 100A may be configured to generate a node table 200 using the correlithm object key 608 and the correlithm object algorithm 610. For example, the first device 100A may use the correlithm object key 608 and correlithm objects 104 as inputs to the correlithm object algorithm 610 to generate a new set of correlithm objects 104. In this example, the correlithm object algorithm 610 generates a unique correlithm object output based on the combination of the correlithm object key 608 and a correlithm object input. The correlithm object algorithm 610 may any suitable type or encrypting algorithm, encoding algorithm, hashing algorithm, or any other suitable type of algorithm as would be appreciated by one of ordinary skill in the art.

In one embodiment, the first device 100A is configured to send the set of real world values 606 to the second device 100B using the unsecure channel 602 and to send the correlithm object key 608 and the correlithm object algorithm 610 to the second device 100B using the secure channel 604. In another embodiment, the first device 100A may be configured to send the set of real world values 606 and the correlithm object algorithm 610 to the second device 100B using the unsecure channel 602 and to send the correlithm object key 608 to the second device 100B using the secure channel 604. In another embodiment, the first device 100A may be configured to send the correlithm object key 608, the correlithm object algorithm 610, and the set of real world values 606 using the secure channel 604.

The second device 100B is configured to input the set of real world values 606 and the correlithm object key 608 into the correlithm object algorithm 610 to generate the set of correlithm objects 612. The generated set of correlithm objects 612 is the same as the set of correlithm objects 612 generated by the first device 100A. The second device 100B is configured to link the set of real world value 606 with corresponding correlithm objects 104 in the set of correlithm object 612 to generate an actor table 310. In one embodiment, the second device 100B is configured to shuffle the order of the real world value and correlithm object pairs in the actor table 310 after generating the actor table 310. The second device 100B is further configured to link an actor 306B with the actor table 310.

In one embodiment, the second device 100B is also configured to link the set of real world value 606 and the generated set of correlithm objects 612 to generate a sensor table 308. The second device 100B may also be configured to shuffle the order of the real world value and correlithm object pairs in the sensor table 308 after generating the sensor table 308. The second device 100B is further configured to link a sensor 302B with the sensor table 308.

Once the first device 100A and the second device 100B have each generated a sensor table 308 and an actor table 310, the first device 100A and the second device 100B may begin communication with each other using correlithm objects 104. In other examples, the first device 100A and the second device 100B may be configured to use any combination of sensors 302, nodes 304, and actors 306 to communication with each other using correlithm objects 104. An example of a process for communicating using correlithm objects 104 between the first device 100A and the second device 100B is described in FIG. 7.

FIG. 7 is a schematic diagram of an embodiment of two devices configured to employ encrypted data communication using correlithm objects. In FIG. 7, a first device 100A and a second device 100B are in signal communication with each other and form a correlithm object processing system 700. The first device 100A and the second device 100B are configured to use a communication channel 702 to communicate with each other. The communication channel 702 may be an unsecure channel 602 and/or a secure channel 604. The first device 100A comprises a first sensor 302A linked with a first sensor table 308A and a first actor 306A linked with a first actor table 310A. Similarly, the second device 100B comprises a second sensor 302B linked with a second sensor table 308B and a second actor 306B linked with a second actor table 310B. In one embodiment, the correlithm object processing system 700 implemented using a process similar to the process described in FIG. 6.

In one embodiment, the set of correlithm objects in the first sensor table 308A are the same as the set of correlithm objects in the first actor table 310A. In another embodiment, at least some of the correlithm objects 104 in the set of correlithm objects in the first sensor table 308A are different than the correlithm objects 104 in the set of correlithm objects in the first actor table 310A. This configuration provides additional information security because the correlithm object processing system 700 uses a first set of correlithm objects to communicate from the first device 100A to the second device 100B and a different set of correlithm objects to communicate from the second device 100B to the first device 100A.

As an example, the first device 100A may provide an input real world value 704 to the first sensor 302A. The first sensor 302A may compare the input real world value 704 to the real world values in the first sensor table 308A to identify a real world value from the first sensor table 308A. The first sensor 302A then fetches a correlithm object linked with the identified real world value from the first sensor table 308A and outputs the identified correlithm object 706 to the second device 100B. The first device 100A may use either an unsecure channel 602 or a secure channel 604 to send the correlithm object 706 to the second device 100B. Once again, correlithm objects 104 provide a level of obfuscation and encryption that protects the data being transmitted regardless of whether the data is being transmitted using a secure channel 604 or an unsecure channel 602. Conventional systems lack this capability and typically data is sent over secure channels to provide data protection.

In this example, the second device 100B receives the correlithm object 706 from the first device 100A and provides the correlithm object 706 to the second actor 306B. The second actor 306B determines distances (e.g. Hamming distances) between the received correlithm object 706 and the correlithm objects in the second actor table 310B and identifies a correlithm object from the second actor table 310B with the shortest distance. The second actor 306B then fetches a real world value 708 from the second actor table 310B that is linked with the identified correlithm object. In this example, the real world value 708 obtained from the second actor table 310B is the same as the original real world value 704 that was provided to the first sensor 302A in the first device 100A.

In one embodiment, the second device 100B may send a new real world value 710 back to the first device 100A. For example, the second device 100B may perform one or more operations on the obtained real world value 708 to generate new real world values 710. The first device 100A and the second device 100B may implement a similar process in the reverse direction to communicate data from the second device 100B to the first device 100A. For example, the second device 100B may provide the new real world value 710 to the second sensor 302B. The second sensor 302B may compare the new real world value 710 the real world values in the second sensor table 308B to identify a real world value from the second sensor table 308B. The second sensor 302B the fetches a correlithm object linked with the identified real world value from the second sensor table 308B and outputs the identified correlithm object 712 to the first device 100A. In this example, the first device 100A receives the correlithm object 712 from the second device 100B and provides the correlithm object 712 to the first actor 306A. The first actor 306A determines distances (e.g. Hamming distances) between the received correlithm object 712 and the correlithm objects in the first actor table 310A and identifies a correlithm object from the first actor table 310A with the shortest distance. The first actor 306A then fetches a real world value 714 from the first actor table 310A that is linked with the identified correlithm object. The real world value 714 obtained from the first actor table 310A is the same as the real world value 710 that was provided to the second sensor 302B in the second device 100B.

Figure 8:
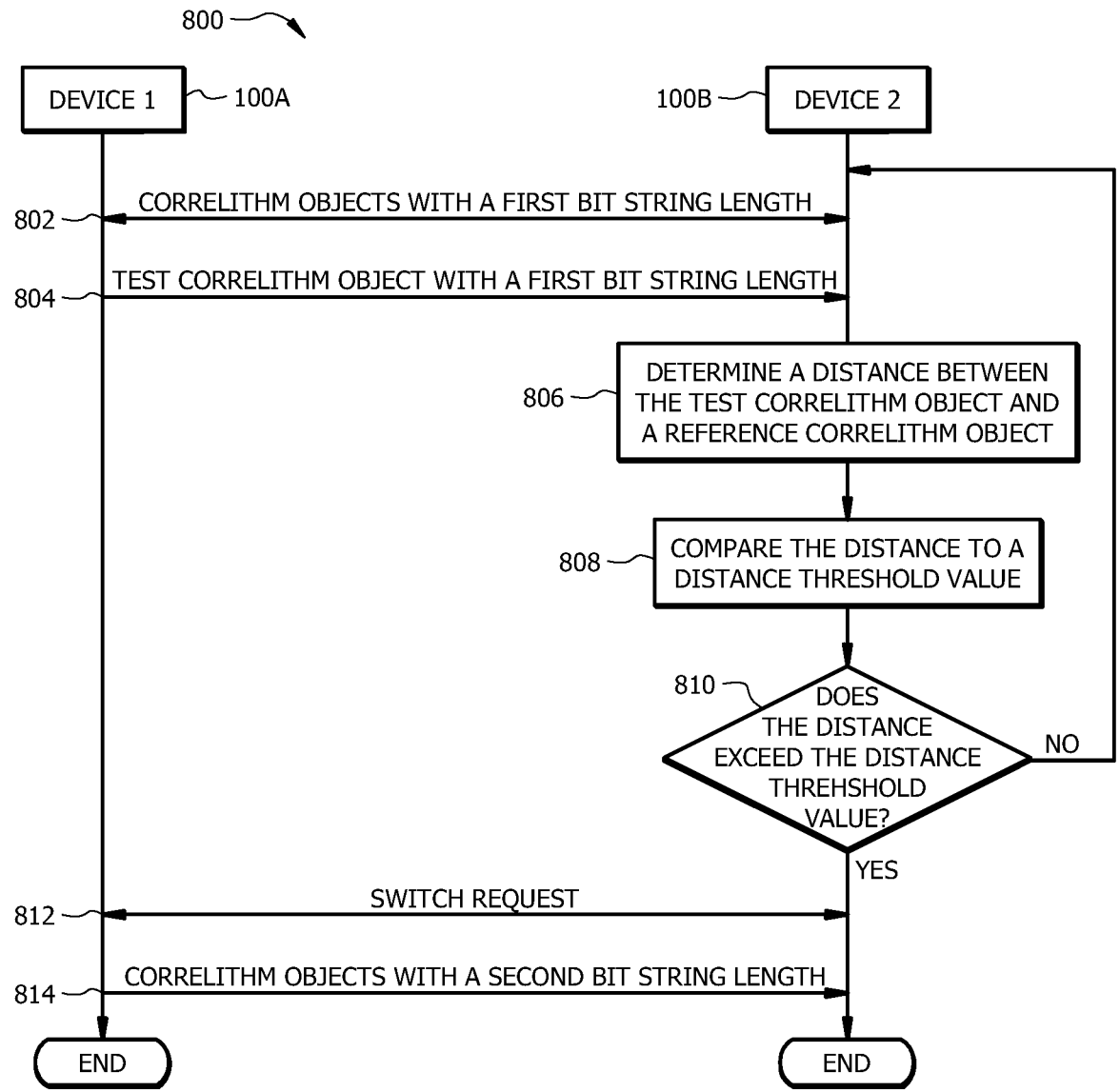
FIG. 8 is a flowchart of an embodiment of a dynamic correlithm object communication method for a correlithm object processing system.

FIG. 8 is a flowchart of an embodiment of a dynamic correlithm object communication method 800 for a correlithm object processing system. The dynamic correlithm object communication method 800 provides the ability for a correlithm object processing system to dynamically change the bit string length of the correlithm objects 104 that are used for data communications. As previously discussed, correlithm objects 104 provide noise immunity when communicating data. The level of noise immunity can be further increased by increasing the bit string length of the correlithm objects 104 being transmitted. In other words, as the length of a correlithm object 104 used by a correlithm object processing system increases, the correlithm object processing system becomes more immune to noise. This means that when a correlithm object processing system determines the quality of a communication channel is noise or poor, the correlithm object processing system can use longer correlithm objects 104 to mitigate the effects of the noise communication channel. Using longer correlithm objects 104 simply increases the number of bits used to represent correlithm objects 104 and does not change the baud rate or transmission rate being used to communicate the correlithm objects 104. This functionality is counter-intuitive to conventional systems. In conventional systems, when the bit error rate of channel becomes too high, the transmitting device typically reduces the transmission rate of the data being transmitted. In contrast to these systems, correlithm objects are able to continue communicating data without reducing the transmission rate, which provides improved performance over conventional systems.

The correlithm object processing system may be configured to communicate between devices using any combination of sensors 302, nodes 304, and actors 306. For example, the correlithm object processing system may be configured similar to the correlithm object processing systems described in FIGS. 6 and 7.

At step 802, a first device 100A exchanges data with a second device 100B using correlithm objects 104 that have a first bit string length. For example, the first device 100B and the second device 100B may communicate with each other using correlithm objects 104 that are 64-bit digital words. In other words, the correlithm objects 104 have a 64-bit string length. In other examples, the first device 100A and the second device 100B may communicate with each other using correlithm objects 104 having any other suitable but length. The first device 100B and the second device 100B may communicate correlithm objects 104 with each other using secure channels 604 and/or unsecure channels 602.

At step 804, the first device 100A sends a test correlithm object to the second device 100B. The test correlithm object has the first bit string length. The test correlithm object is a predetermined correlithm object 104 that is used by the first device 100A and the second device 100B to determine the quality (e.g. the signal to noise ratio (SNR)) of the communication channel being used to communicate correlithm objects 104. The process for determining the quality of the communication channel is described below in steps 806-810. In one embodiment, the first device 100A is configured to send test correlithm objects to the second device 100B at predetermined time intervals. For example, the first device 100A may send test correlithm objects every thirty seconds, every minute, every five minutes, or after any suitable amount of time.

At step 806, the second device 100B determines the distance between the test correlithm object and a reference correlithm object. The distance between the test correlithm object and the reference correlithm object is the number of different bits between the digital word representing the test correlithm object and a digital word representing the reference correlithm object. The reference correlithm object has the same bit string length as the test correlithm object. Continuing with the previous example where the test correlithm object is a 64-bit digital word, the reference correlithm object is also a 64-bit digital word. The second device 100B may use any of the previously described techniques for determining the distance between the test correlithm object and the reference correlithm object. For example, the second device 100B may compute the Hamming distance between the test correlithm object and the reference correlithm object. As another example, the distance between the test correlithm object and the reference correlithm object can be determined by performing an XOR operation between the test correlithm object and the reference correlithm object and counting the number of logical high values in the binary string. The number of logical high values indicates the number of bits that are different between the test correlithm object and the reference correlithm object which also corresponds with the Hamming distance between the test correlithm object and the reference correlithm object. In other examples, the distance between the test correlithm object and the reference correlithm object can be determined using a Minkowski distance such as the Euclidean or "straight-line" distance between the test correlithm object and the reference correlithm object.

At step 808, the second device 100B compares the distance between the test correlithm object and the reference correlithm object to a distance threshold value. The distance threshold value indicates a maximum number of bits that can be different between the test correlithm object and the reference correlithm object. For example, the distance threshold may be set to 5 bits, 10 bits, 20 bits, 32 bits, 45 bits, or any suitable number of bits.

At step 810, the second device 100B determines whether the distance between the test correlithm object and the reference correlithm object exceeds the distance threshold value. The second device 100B returns to step 802 in response to determining that the distance between the test correlithm object and the reference correlithm object does not exceed the distance threshold value. When the distance between the test correlithm object and the reference correlithm object does not exceed the distance threshold value, the second device 100B determines that the SNR of the communication channel is within the tolerances for communicating correlithm objects 104 and continues to receive correlithm objects 104 having the first bit string length.

The second device 100B proceeds to step 812 in response determining that the distance between the test correlithm object and the reference correlithm object exceeds the distance threshold value. When the distance between the test correlithm object and the reference correlithm object exceeds the distance threshold value, the second device 100B determines that the SNR of the communication is not within the tolerances for communication correlithm objects 104. In other words, the communication channel is too noisy and causing unsuitable bit error rate for communication using correlithm objects 104 having the first bit string length.

At step 812, the second device 100B sends a switch request to the first device 100A. The switch request is a command or signal that triggers the first device 100A to switch from sending correlithm object 104 having the first bit string length to sending correlithm objects 104 having a second bit string length that is longer than the first bit string length. The switch request may be any predetermined real world value or correlithm object 104.

At step 814, the first device 100A receives the switch command and begins exchanging data with the second device 100B using correlithm objects 104 that have the second bit string length in response to receiving the switch command. The second bit string length is longer than the first bit string length. For example, the first device 100B and the second device 100B may communicate with each other using correlithm objects 104 that are 128-bit digital words instead of 64-bit digital words. In other examples, the first device 100A and the second device 100B may communicate with each other using correlithm objects 104 having any other suitable bit string length. In one embodiment, the switch command may identify the number of bits for the second bit string length. For example, the switch command may comprise a bit string length value of 128 which indicates the second bit string length is 128 bits. As another example, the switch command may be a correlithm object linked with a real world value that identifies the second bit string length.

In another embodiment, the first device 100A is configured to send a flag correlithm object to the second device 100B before sending correlithm objects 104 having the second bit string length. The flag correlithm object corresponds with a real world value that identifies the number of bits in the second bit string length. For example, the second device 100B may receive the flag correlithm object and use an actor 306 to convert the flag correlithm object to a real world value that identifies the second bit string length. As an example, the second device 100B may determine the real world value corresponding with the flag correlithm object is 256, which indicates that the second bit string length is 256 bits. The flag correlithm object allows the second device 100B to adjust its buffer to receive longer correlithm objects 104. In some instances, the flag correlithm object may also be used for synchronization to indicate that the next transmission of correlithm objects 104 will have the second bit string length.

In one embodiment, switching from sending correlithm objects 104 having the first bit string length to the second bit string length does not change the baud rate of the signal being used to communicate correlithm objects 104 between the first device 100A and the second correlithm object 100B. In other words, the first device 100A does not change (e.g. reduce) the transmission rate or speed when sending correlithm objects 104 having the second bit string length to the second device 100B.

Figure 9:
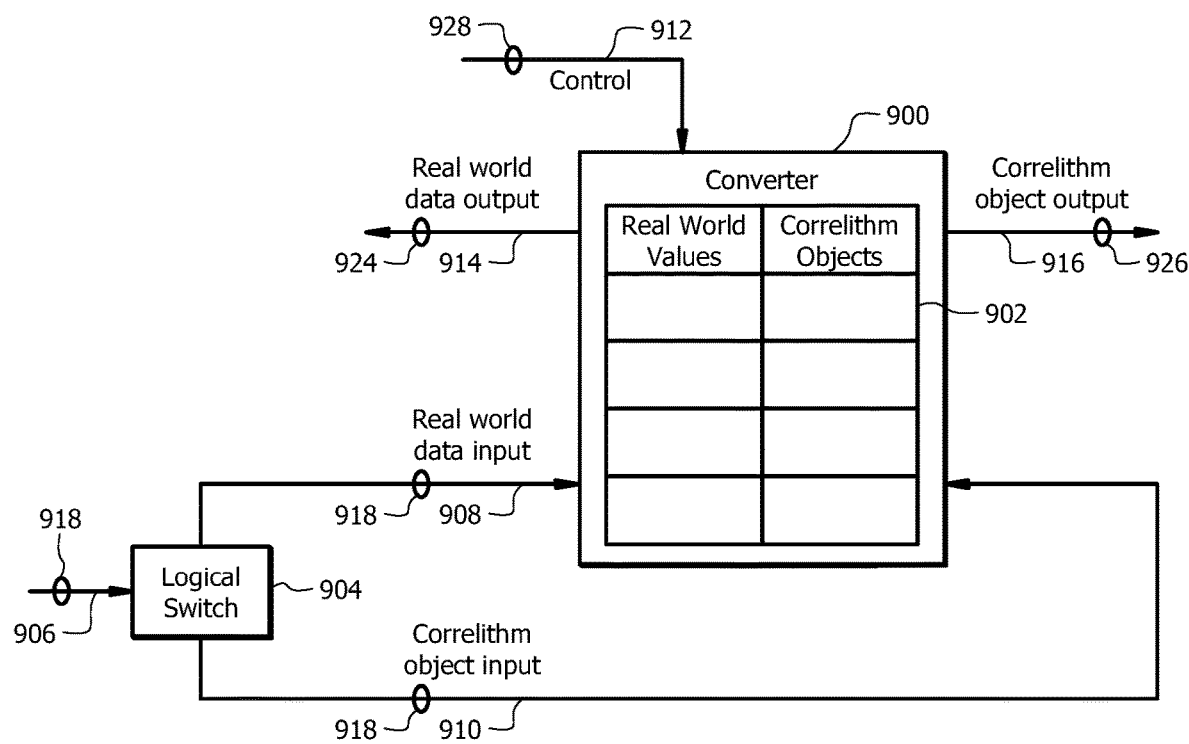
FIG. 9 is a schematic diagram of an embodiment of a correlithm object converter for a correlithm object processing system.

FIG. 9 is a schematic diagram of an embodiment of a correlithm object converter 900 for a correlithm object processing system. The correlithm object converter 900 provides the combined functionality of a sensor 302 and an actor 306. For example, a correlithm object convert 900 may be used in place of the first sensor 302A and the first actor 306A in the first device 100A of the correlithm object processing system 700 described in FIG. 7. Using a correlithm object converter 900 may use less system resources compared to implementing both a sensor 302 and an actor 304.

The correlithm object converter 900 is linked with a converter table 902 that comprises a set of real world values and a set of correlithm objects. The correlithm object converter 900 is configured to receive real world value and correlithm objects 104 as inputs and to output corresponding correlithm objects 104 and real world values, respectively. For example, the correlithm object converter 900 may convert real world values to correlithm objects 104. The correlithm object converter 900 may be configured to convert real world values to correlithm objects 104 in a manner similar to the previously described sensors 302. As another example, the correlithm object converter 900 may convert correlithm objects 104 to real world values. The correlithm object converter 900 may be configured to convert correlithm objects 104 to real world values in a manner similar to the previous described actors 306.

In one embodiment, the correlithm object converter 900 is configured with two inputs where a first input 908 is configured for receiving real world values and a second input 910 is configured for receiving correlithm objects 104. In another embodiment, the correlithm object converter 900 may be configured with a single input (not shown) configured to receive both real world values and correlithm objects 104. In one embodiment, the correlithm object converter 900 is configured with two outputs where a first output 914 is configured to output real world values as a first output signal and a second output 916 is configured to output correlithm objects as a second output signal. In another embodiment, the correlithm object converter 900 is configured to output both real world values and correlithm objects using a single common output (not shown).

In FIG. 9, when a real world value is received as an input signal 918 at the first input 908 of the correlithm object converter 900, the correlithm object converter 900 is configured to identify a real world value in the converter table 902 based on the input signal 918. The correlithm object converter 900 is further configured to fetch a correlithm object linked with the identified real world value and to output the identified correlithm object as an output signal 926 on the first output 916 of the correlithm object converter 900. When a correlithm object is received as the input signal 918 at the second input 910 of the correlithm object converter 900, the correlithm object converter 900 is configured to determine distances between the received correlithm object and each of the correlithm objects in the converter table 902 and to identify a correlithm object from the converter table 902 with the shortest distance. The correlithm object converter 900 is further configured to fetch a real world value from the converter table 902 that is linked with the identified correlithm object and to output the identified real world value as an output signal 924 on the second output 914 of the correlithm object converter 900.

In one embodiment, the correlithm object converter 900 is configured with a control input 912. The control input 912 may be used to control the mode of operation for the correlithm object converter 900. For example, the correlithm object converter 900 may receive a first control signal 928 that triggers the correlithm object converter 900 to operate like a sensor 302. The correlithm object converter 900 may receive a second control signal 928 that triggers the correlithm object converter 900 to operate like an actor 306. The control signal 928 may any suitable type of analog or digital signal as would be appreciated by one of ordinary skill in the art.

In one embodiment, the correlithm object converter 900 is operably coupled to a logical switch 904. The logical switch 904 may be implement in any combination of hardware and software. The logical switch 904 is configured to receive an input signal 918, to determine a data type for the input signal 918, and to send the input signal 918 to one of the inputs of the correlithm object converter 900 based on the data type of the input signal 918. For example, the logical switch 904 may receive an input signal 918 at its input 906 and may process the input signal 918 to determine its data type. The data types of the input signal 918 may be either a real world value or a correlithm object 104. The logical switch 904 is configured to send the input signal 918 to the first input 908 of the correlithm object converter 900 when the input signal 918 has a real world value data type. The logical switch 904 is configured to send the input signal 918 to the second input 910 of the correlithm object converter 900 when the input signal 918 has a correlithm object data type.

Figure 10:
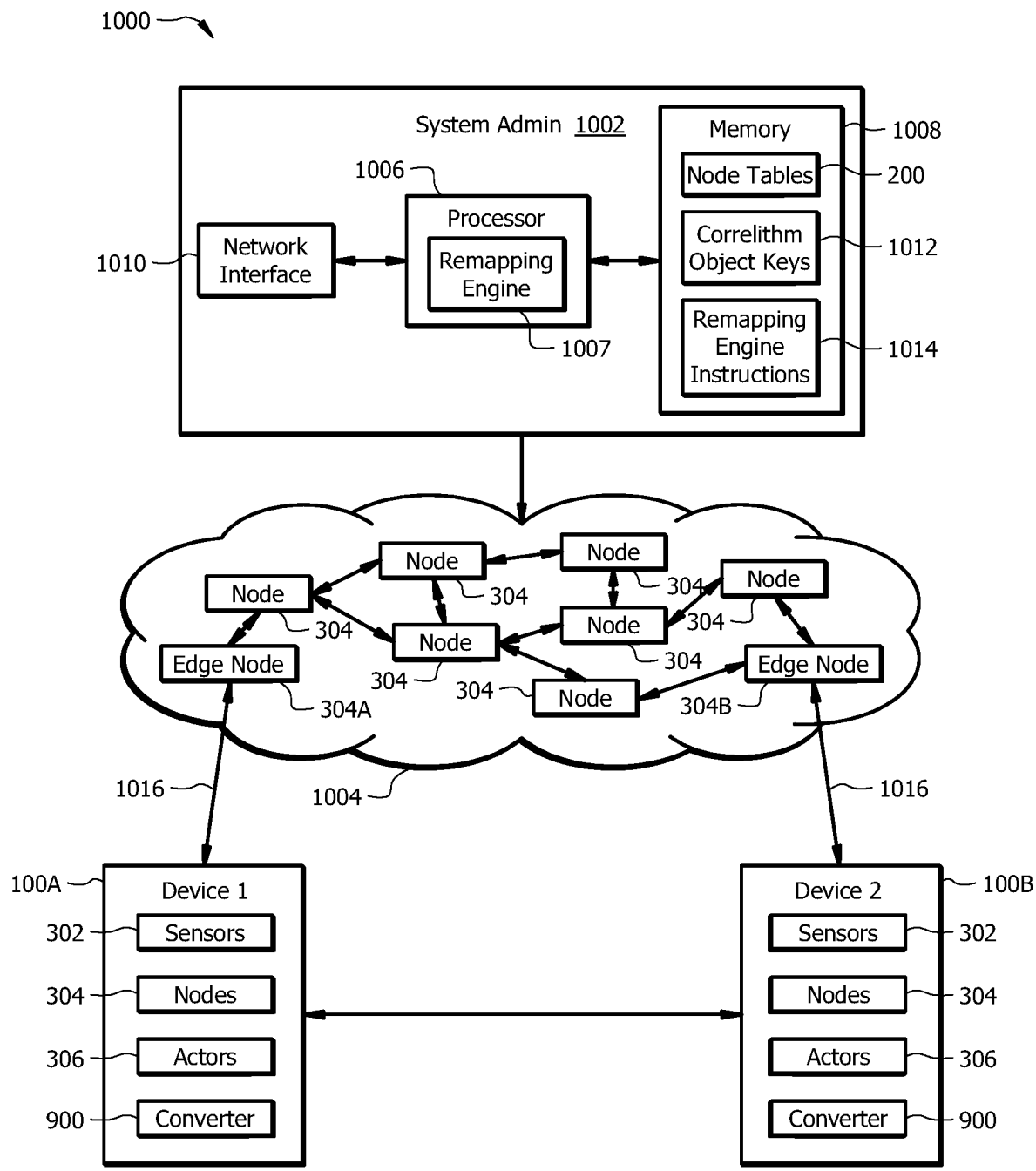
FIG. 10 is a schematic diagram of an embodiment of a cloud based correlithm object processing system.

FIG. 10 is a schematic diagram of an embodiment of a cloud based correlithm object processing system 1000. A cloud based correlithm object processing system 1000 provides the architecture to allow correlithm objects 104 to be processed remotely as cloud services. For example, a device 100 may send correlithm objects 104 to the cloud based correlithm object processing system 1000 to offload the resources used for processing the correlithm objects 104. In this example, the device 100 is able to receive processed correlithm objects 104 from the cloud based correlithm object processing system 1000 without having to consume the device's 100 processing resources. The cloud based correlithm object processing system 1000 allows devices 100 to utilize the benefits of correlithm objects 104 (e.g. noise immunity and information security) while offloading the computing resources.

In FIG. 10, the correlithm object processing system 1000 comprises a system admin device 1002 in signal communication with a network 1004 of correlithm object nodes 304. Examples of the system admin device 1002 include, but are not limited to, servers, access points, desktop computers, mobile phones, tablet computers, laptop computers, or other special purpose computer platform. In one embodiment, the system admin device 1002 comprises a processor 1006, a memory 1008, and a network interface 1010. The processor 1106 may be configured similar to the processor 502 described in FIG. 5. The processor 1006 is configured to execute instructions to implement a remapping engine 1007. In an embodiment, the remapping engine 1007 is implemented using logic units, FPGAs, ASICs, DSPs, or any other suitable hardware. The remapping engine 1007 is configured to facilitate remapping node table 200 for nodes 304 in the network 1004. Examples of node table 200 remapping are described in FIGS. 15A-15C, 16, and 17.

The memory 1008 may be configured similar to the memory 504 described in FIG. 5. The memory 1008 is operable to store node tables 200, correlithm object keys 1012, correlithm object algorithms 1013, remapping engine instructions 1014, and/or any other data or instructions. The remapping engine instructions 1014 may comprise any suitable set of instructions, logic, rules, or code operable to execute the remapping engine 1007. The correlithm object keys 1012 and the correlithm object algorithms 1013 may be similar to the correlithm object key 608 and the correlithm object algorithm 610 described in FIG. 6.

The network interface 1010 may be configured similar to the network interface 506 described in FIG. 5. The network interface 1010 is configured to communicate data between the system admin device 1002 and devices in the network 1004. For example, the network interface 1010 is configured to allow the system admin device 1002 to exchanging node tables 200, correlithm object keys 1112, and/or any other type of data with the nodes 304 and devices in the network 1004.

The network 1004 comprises one or more devices configured to implement or emulate nodes 304. Examples of the devices implementing the network 1004 include, but are not limited to, servers, access points, desktop computers, mobile phones, tablet computers, laptop computers, or other special purpose computer platform. In one embodiment, devices implementing the network 1004 may be configured similar to the device 500 described in FIG. 5. Typically, the network 1004 is implemented by devices that are in a different physical location than the devices 110A and 100B communicating with the network 1004. Each node 304 in the network 1004 is in signal communication with one or more other nodes 304 in the network 1004. The nodes 304 in the network 1004 are generally configured to receive correlithm objects 104, to perform one or more operation on the correlithm objects 104 by identifying correlithm objects 104 based on the received correlithm objects 104, and to output a resulting correlithm object 104 to one or more other nodes 304 and/or devices.

The network 1004 comprises interior nodes and edge nodes. Interior nodes are nodes 304 that are not in direct signal communication with devices outside of the network, for example devices 100A and 100B. Interior node 304 communication with devices outside of the network 1004 via edge nodes. Edge nodes are nodes 304 in the network 1004 that are in signal communication with devices external from the network 1004 of nodes 304. For example, in FIG. 10, a first edge node 304A is in signal communication with a first device 100A and a second edge node 304B is in signal communication with a second device 100B. Edge nodes 304 are configured to receive correlithm objects 104 from a device external from the network 1004 (e.g. device 100A and device 100B), to process the correlithm object 104, and to send the resulting correlithm object 104 to one or more other nodes 304 (e.g. interior nodes) within the network 1004. The edge nodes 304 are further configured to receive processed correlithm objects 104 from the network 1004 and to send the processed correlithm objects 104 back to devices outside of the network 1004. Examples of using nodes 304 in the network 1004 to process correlithm objects 104 are described in FIGS. 11-14.

In FIG. 10, the first device 100A may comprise any suitable number and combination of sensors 302, nodes 304, actors 306, and/or converters 900. Similarly, the second device 100B may also comprise any suitable number and combination of sensors 302, nodes 304, actors 306, and/or converters 900. In this example, the first device 100A and the second device 100B are each in signal communication with at least one edge node 304 of the network 1004. The first device 100A and the second device 100B may employ any suitable type of wired or wireless connection 1016 and protocol to connect with nodes 304 in the network 1004. In some embodiments, the first device 100A and the second device 100B are in signal communication with each other and are configured to exchange data with each other. The first device 100A and the second device 100B may employ any suitable type of wired or wireless connection and protocol to connect with each other.

Figure 11:
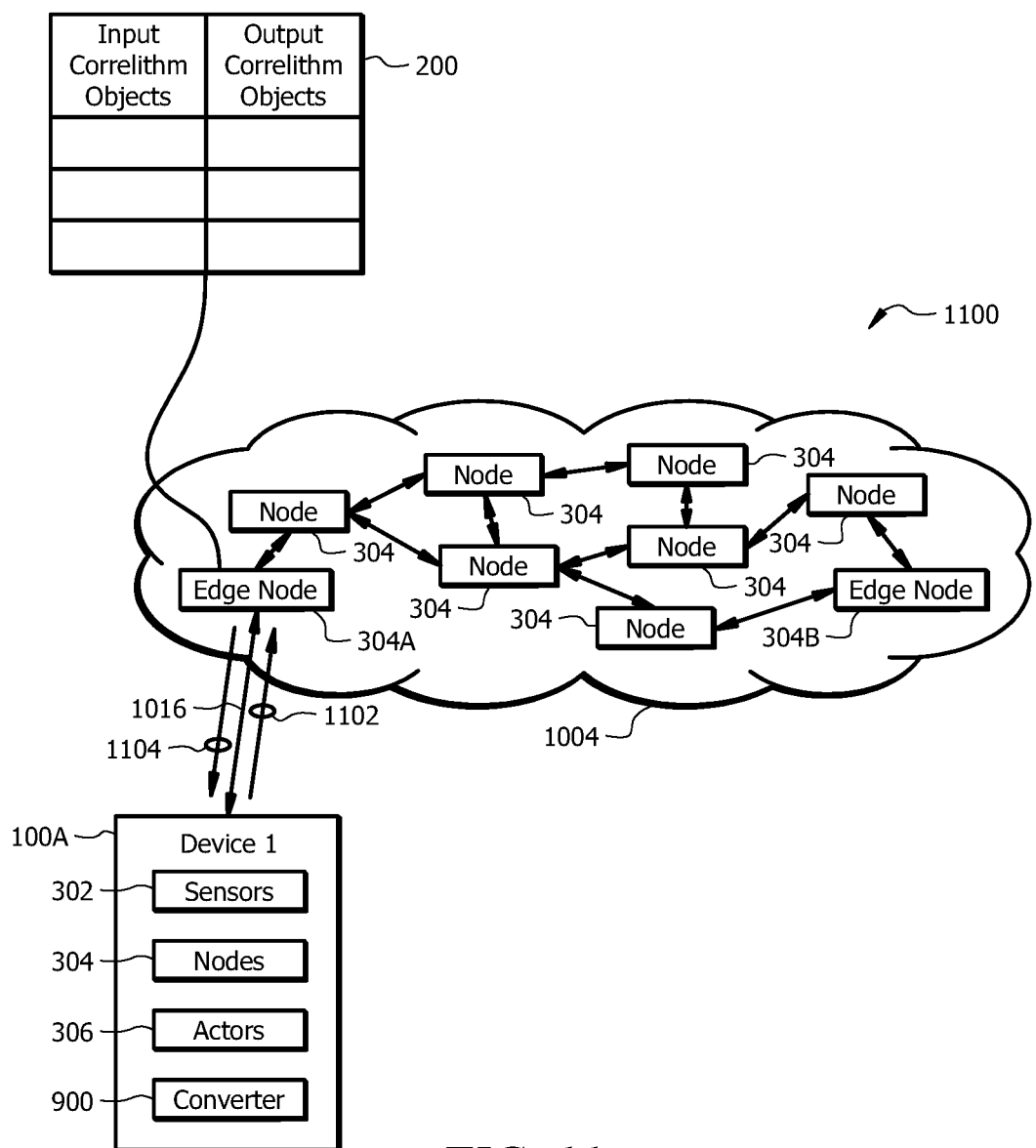
FIG. 11 is a schematic diagram of an embodiment of a device utilizing a cloud based correlithm object processing system.

FIG. 11 is a schematic diagram of an embodiment of a device 100A utilizing a cloud based correlithm object processing system 1100. In one embodiment, the correlithm object processing system 1100 is configured similar to the correlithm object processing system 1000 described in FIG. 10. In other embodiments, the correlithm object processing system 1100 may be in any other suitable configuration.

In FIG. 11, the correlithm object processing system 1100 is configured to allow a device 100A to send correlithm objects 104 to the network 1004 for processing. This allows the device 100A to offload the resources used for processing correlithm objects 104 to the correlithm object processing system 1100. In this example, an edge node 304A receives a correlithm object 1102 from the device 100A. The edge node 304A is configured to process the received correlithm object 1102 to identify an output correlithm object and to send the output correlithm object to one or more other nodes 304 in the network 1004 for further processing. For example, the edge node 304A is configured to determine distances between the received correlithm objects and input correlithm objects in its node table 200. The edge node 304A may use any of the previously described techniques for determining the distance between the received correlithm object and an input correlithm object. For example, the edge node 304A may compute the Hamming distance between the received correlithm object and an input correlithm object. As another example, the distance between the received correlithm object and an input correlithm object can be determined by performing an XOR operation between the received correlithm object and an input correlithm object and counting the number of logical high values in the binary string. The number of logical high values indicates the number of bits that are different between the received correlithm object and an input correlithm object which also corresponds with the Hamming distance between the received correlithm object and an input correlithm object. In other examples, the distance between the received correlithm object and an input correlithm object can be determined using a Minkowski distance such as the Euclidean or "straight-line" distance between the received correlithm object and an input correlithm object.

The edge node 304A is further configured to receive a processed correlithm object 1104 from a node 304 (e.g. an interior node) in the network 1004 and to send the processed correlithm object 1104 back to the device 100A. In one embodiment, the edge node 304A is configured to process the received correlithm object 1104 to identify an output correlithm object and to send the output correlithm object to the device 100A.

Figure 12:
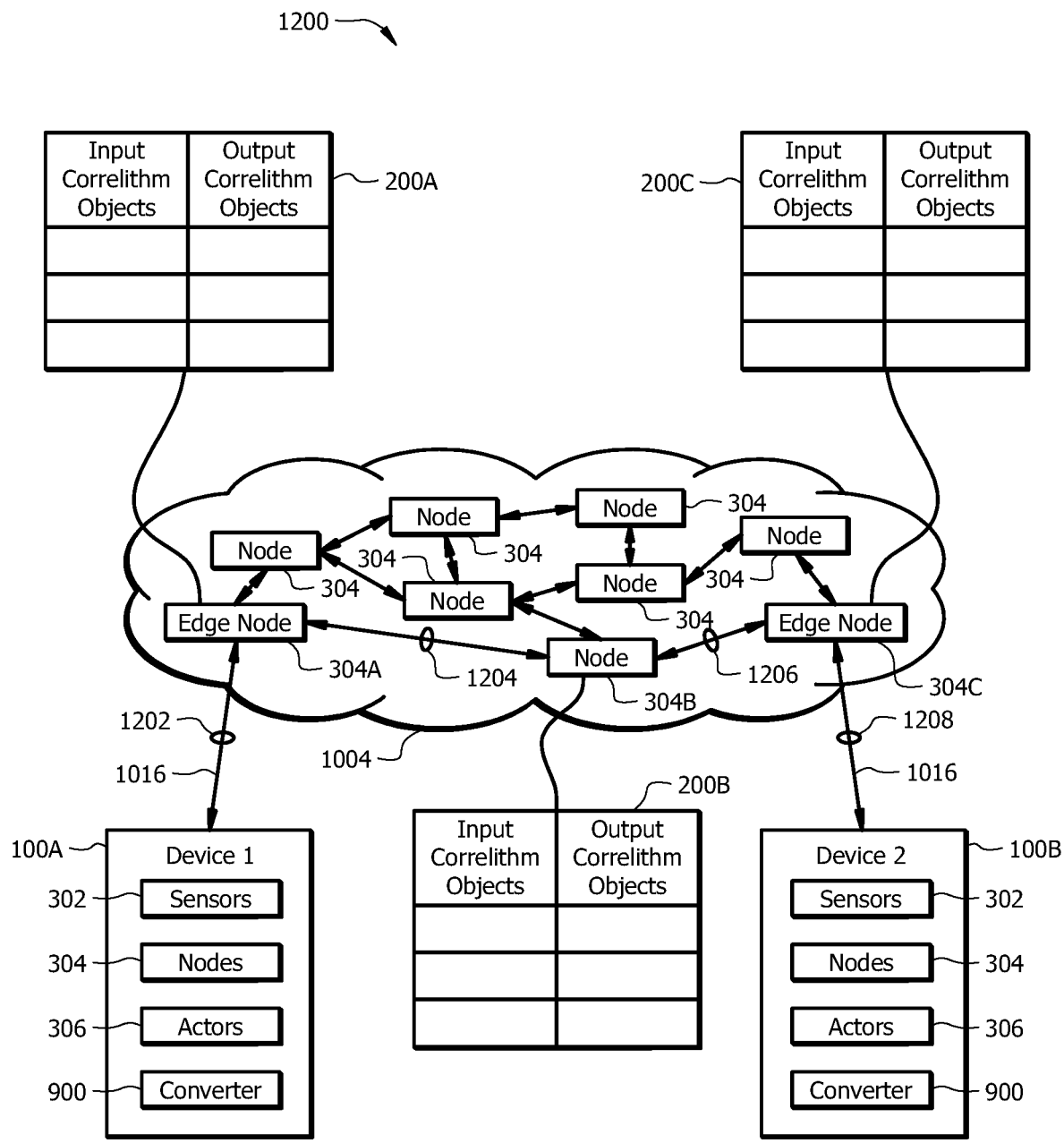
FIG. 12 is a schematic diagram of an embodiment of devices communicating data using a cloud based correlithm object processing system.

FIG. 12 is a schematic diagram of an embodiment of devices 100A and 100B communicating data using a cloud based correlithm object processing system 1200. In one embodiment, the correlithm object processing system 1200 is configures similar to the correlithm object processing system 1000 described in FIG. 10. In other embodiments, the correlithm object processing system 1200 may be in any other suitable configuration.

In FIG. 12, the correlithm object processing system 1200 is configured to allow a first device 100A to send correlithm objects 104 to a second device 100B via nodes 304 in the network 1004. This configuration allows data to be simultaneously processed using correlithm objects 104 as its transmitted across the network 1004. In this example, the first edge node 304A receives a correlithm object 1202 from the first device 100A. The first edge node 304A is configured to process the received correlithm object 1202 to identify an output correlithm object 1204 in a first node table 200A and to send the output correlithm object 1204 to one or more other nodes 304 in the network 1004 for further processing. The first edge node 304A may process the received correlithm object 1202 using a process similar to the process described in FIG. 11. In this example, the first edge node 304A sends the output correlithm object 1204 to interior node 304B in the network 1004. The interior node 304B is configured to receive the correlithm object 1204, to process the received correlithm object 1204 to identify an output correlithm object 1206 in a second node table 200B, and to send the output correlithm object 1206 to a second edge node 304C. The interior node 304B may process the received correlithm object 1204 using a process similar to the process described in FIG. 11. The second edge node 304C is configured to receive the correlithm object 1206, to process the received correlithm object 1206 to identify an output correlithm object 1208 in a third node table 200C, and to send the output correlithm object 1208 to the second device 100B. The third edge node 304C may process the received correlithm object 1206 using a process similar to the process described in FIG. 11.

Figure 13:
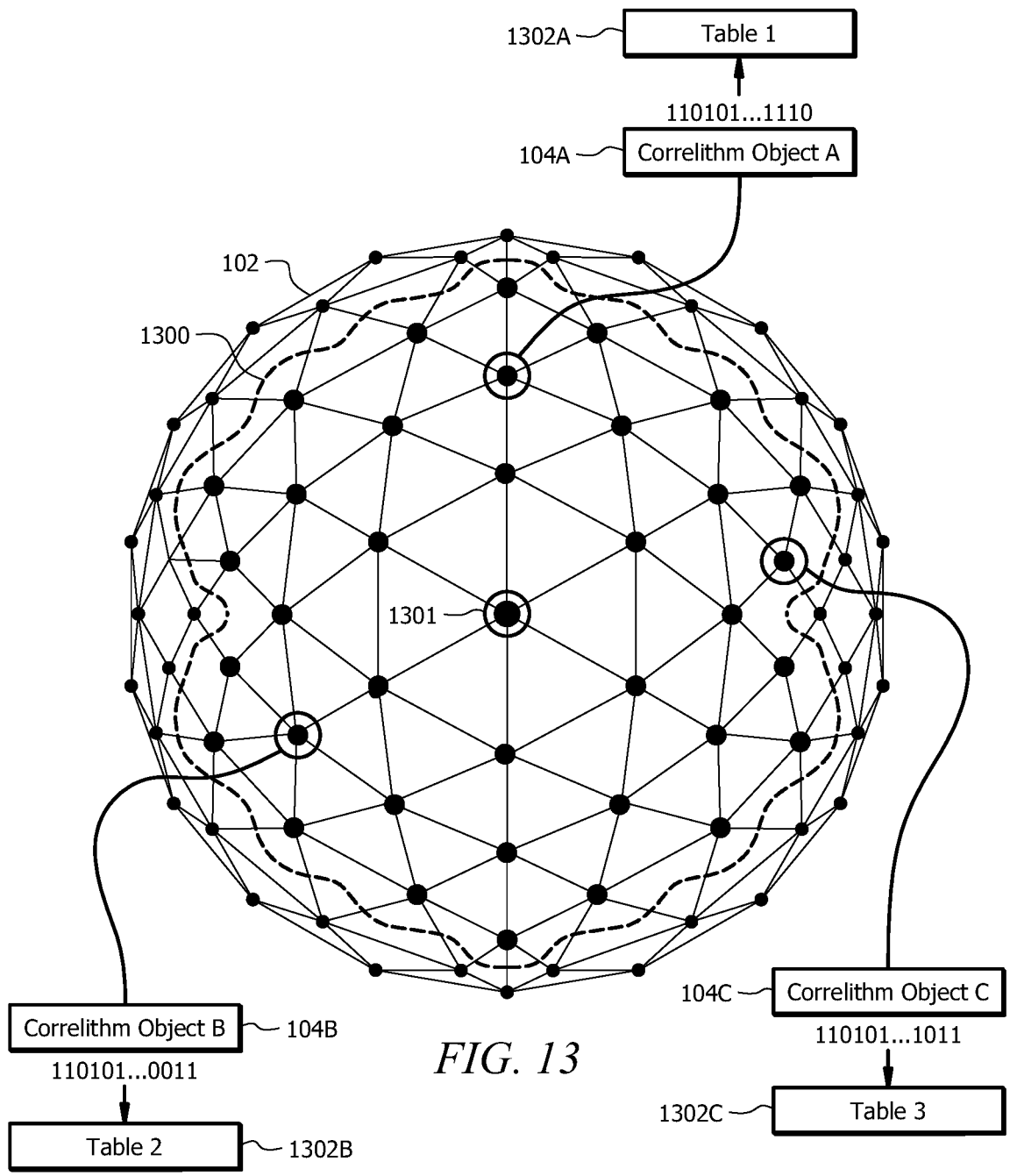
FIG. 13 is a schematic diagram of an embodiment of a correlithm object core used for implementing correlithm object diversity in a correlithm object processing system.

FIG. 13 is a schematic diagram of an embodiment of a correlithm object core 1300 used for implementing correlithm object diversity in a correlithm object processing system. A correlithm object core 1300 allows correlithm object components (e.g. sensors 302, nodes 304, and actors 306) to use different correlithm objects 104 within a correlithm core 1300 that are all linked to a common root correlithm object 1301. In other words, different correlithm object components can each use different correlithm objects 104 that all refer to the same root correlithm object 1301. Using different correlithm objects for different devices provides information security for a correlithm object processing system because each device can use tables with different correlithm objects 104. This means that a device 100 using correlithm objects 104 has no information about the correlithm objects 104 being used in another device 100 that is also using correlithm objects 104. Each device 100 has its own set of tables (e.g. sensor table 308, node table 200, and actor 310) with its own set of correlithm objects 104. An example of using root correlithm objects to implement correlithm object diversity is described in FIG. 14.

A correlithm object core 1300 comprises a root correlithm object 1301 that is linked with a set of correlithm objects 104. The set of correlithm objects 104 are linked with only one root correlithm object 1301. The set of correlithm objects 104 are correlithm objects 104 which are located within the core distance (shown as a dashed line perimeter) of the root correlithm object 1301. The core distance defines the maximum number of bits that can be different between a correlithm object 104 and the root correlithm object 1301 to be considered within a correlithm object core for the root correlithm object 1301. In other words, the core distance defines the maximum number of hops away a correlithm object 104 can be from a root correlithm object 1301 to be considered a part of the correlithm object core for the root correlithm object 1301. When a correlithm object 104 is within the correlithm object core 1300, it can be used to reference the root correlithm object.

In general, the average distance between correlithm objects in an n-dimensional space 102 is equal to about half the number of bits used to represent correlithm objects 104 in the n-dimensional space 102. This value also corresponds with the average number of bits that are different between a random correlithm object 104 and a particular correlithm object 104. As an example, the average distance between correlithm objects 104 in the 64-dimensional space 102 is equal to 32 bits. In one embodiment, a core distance may be defined in terms of a number of standard deviations away from the average distance between correlithm objects in an n-dimensional space 102. For example, a core distance may be equal to six standard deviations away from the average distance between correlithm objects in an n-dimensional space 102. In general, the standard deviation is equal to $$\sqrt{\frac{n}{4}},$$

where 'n' is the number of dimensions in the n-dimensional space 102 which also corresponds with the number of bits in the n-bit digital word used to represent correlithm objects. Continuing with the previous example, the standard deviation of the 64-dimensional space 102 is equal to 4 bits. This means that a cutoff region for a correlithm object core 1300 is located 24 bits away from the average distance between correlithm objects which is 32 bits or 8 bits (i.e. 32 bits-24 bits) away from the root correlithm object 1301. In other words, the core distance in this example is equal to 8 bits. This means that the cutoff region for a correlithm object core includes correlithm objects 104 that have up to 8 bits different than the root correlithm object or are up to 8 hops away from the root correlithm object 1301. In other words, correlithm objects 104 within up to eight hops away from the root correlithm object 1301 are members of the correlithm object core 1300 for the root correlithm object 1301 and can be used to reference the root correlithm object. In other examples, the cutoff region that defines the core distance may be equal any other suitable value. For instance, the cutoff region for the correlithm object core 1300 may be set to 1, 2, 3, 4, 5, 8, 10, 12, or any other suitable number of standard deviations away from the average distance between correlithm objects 104 in the n-dimensional space 102.

As an example, a first correlithm object component may use a first table 1302A with a first correlithm object 104A that is within the correlithm object core 1300 of the root correlithm object 1301. A second correlithm object component may use a second table 1302B with a second correlithm object 104B that is within the correlithm object core 1300 of the root correlithm object 1301. A third correlithm object component may use a third table 1302C with a third correlithm object 104C that is within the correlithm object core 1300 of the root correlithm object 1301. In this example, the first correlithm object 104A, the second correlithm object 104B, and the third correlithm object 104C all have different values. However, because all three correlithm objects 104A, 104B, and 104C are all within the correlithm object core 1300 of the root correlithm object 1301 they all can be used to reference the root correlithm object 1301.

Figure 14:
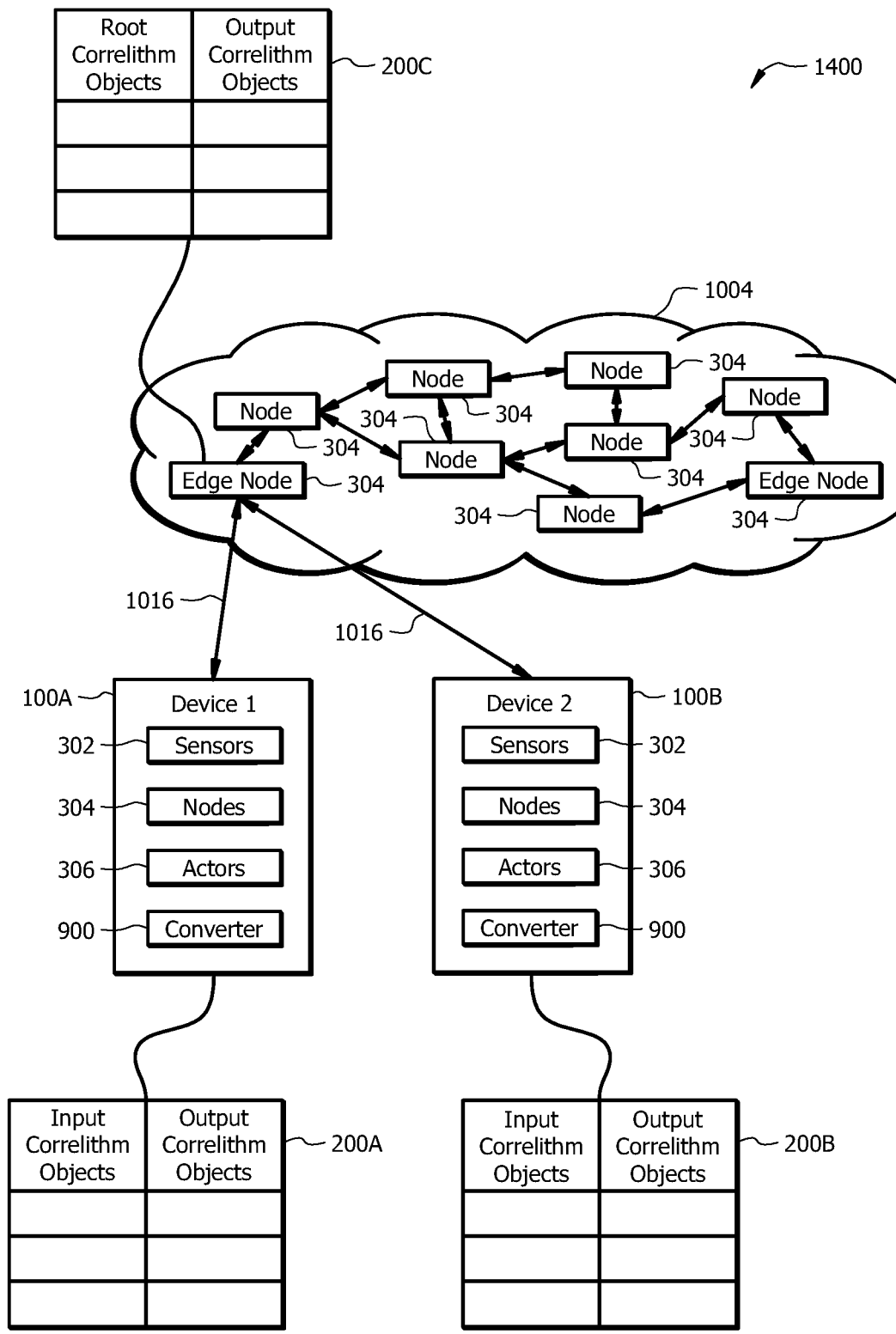
FIG. 14 is a schematic diagram of an embodiment of a correlithm object processing system implementing correlithm object diversity.

FIG. 14 is a schematic diagram of an embodiment of a correlithm object processing system 1400 implementing correlithm object diversity. The correlithm object processing system 1400 may be configured similar to the correlithm object processing system 1000 described in FIG. 10. In this example, a device configured to implement a portion of the network 1004 comprises a memory and processor configured to emulate an edge node 304. The memory is operable to store a node table 200 that links a set of root correlithm objects with a corresponding set of output correlithm objects. The memory may be configured similar to memory 504 described in FIG. 5. The edge node 304 is in signal communication with a first device 100A and a second device 100B. In one embodiment, the first device 100A and/or the second device 100B are devices outside of the network 1004. The first device 100A and/or the second device 100B may be in a different physical location than the device implementing the edge node 304. In another embodiment, the first device 100A and/or the second device 100B may be devices configured to implement nodes 304 in the network 1004.

The edge node 304 is configured to define a first set of correlithm objects for the first device 100A. The first set of correlithm objects comprises at least a first correlithm object within a core distance of a root correlithm object from the set of root correlithm objects in the node table 200 of the edge node 304. The first set of correlithm objects may further comprise any number of other correlithm objects 104 that are within a core distance of a root correlithm object from the set of root correlithm objects in the node table 200 of the edge node 304. The edge node 304 is further configured to send the defined first set of correlithm objects 104 to the first device 100A. Similarly, the edge node 304 is configured to define a second set of correlithm objects for the second device 100B. The second set of correlithm objects comprises at least a second correlithm object within the core distance of the root correlithm object from the set of root correlithm objects in the node table 200 of the edge node 304. The second set of correlithm objects may further comprise any other number of correlithm objects 104 that are within a core distance of a root correlithm object from the set of root correlithm objects in the node table 200 of the edge node 304. In this example, the first correlithm object and the second correlithm object have different values but are both within the core distance of a common root correlithm object. This allows the edge node 304 to use different correlithm objects for the first device 100A and the second device 100B to reference the same common correlithm object (i.e. the root correlithm object). The edge node 304 is further configured to send the defined second set of correlithm objects to the second device 100B.

The first device 100A and the second device 100B may use the first set of correlithm objects and the second set of correlithm objects, respectively, in a sensor table 308, a node table 200, and/or an actor table 310. For example, in FIG. 14, the first device 100A uses the first set of correlithm objects as output correlithm objects in a first node table 200A and the second device 100B uses the second set of correlithm objects as output correlithm objects in a second node table 200B. In this example, the first device 100A is configured to use the first set of correlithm objects to communicate with the edge node 304. Similarly, the second device 100B is configured to uses the second set of correlithm objects to communicate with the edge node 304.

FIGS. 15A-15C, 16, and 17 are examples of processes for changing correlithm objects 104 and changing values in tables storing correlithm objects 104. In some embodiment, the correlithm objects 104 used in a correlithm object processing system may be periodically changed provided increased information security for the correlithm object processing system. Constantly changing the correlithm objects 104 that are being used increases the difficulty for a bad actor to extract information from a correlithm object processing system. Since the correlithm objects 104 are constantly changing a bad actor has no way of knowing whether extracted correlithm objects 104 are still valid. Correlithm objects 104 can be changed anytime without interfering with the performance of the correlithm object processing system. Conventional systems are unable to implement such a feature because changing values within a system would require the entire system to be remap which typically requires downtime for the system.

Figure 15A:
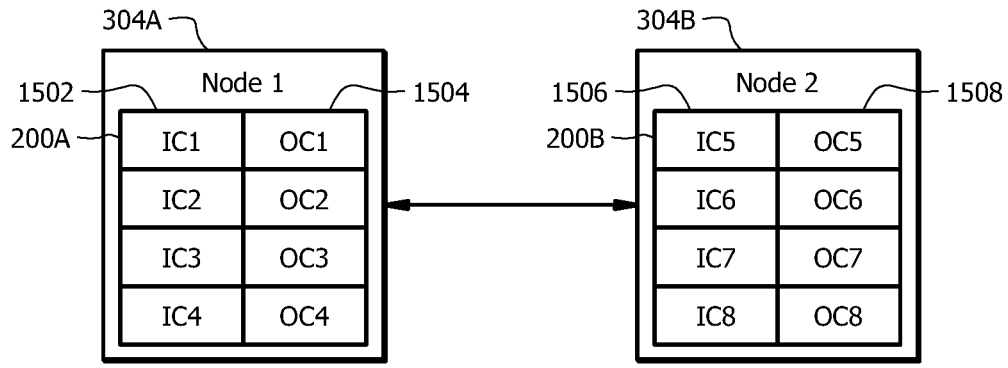
FIG. 15A is a schematic diagram of an embodiment of a first phase of a node table remapping.

FIG. 15A is a schematic diagram of an embodiment of a first phase of a node table remapping. In FIG. 15A, a first node 304A is configured to use a first node table 200A and a second node 304B is configured to use a second node table 304B. The first node table 200A comprises a first set of input correlithm objects 1502 (shown as IC1, IC2, IC3, and IC4) and a first set of output correlithm objects 1504 (shown as OC1, OC2, OC3, and OC4). Each of the input correlithm objects 1402 corresponds with one of the output correlithm objects 1504. The second node table 200B comprises a second set of input correlithm objects 1506 (shown as IC5, IC6, IC7, and IC8) and a second set of output correlithm objects 1508 (shown as OC5, OC6, OC7, and OC8). Each of the input correlithm objects 1506 corresponds with one of the output correlithm objects 1508.

Figure 15B:
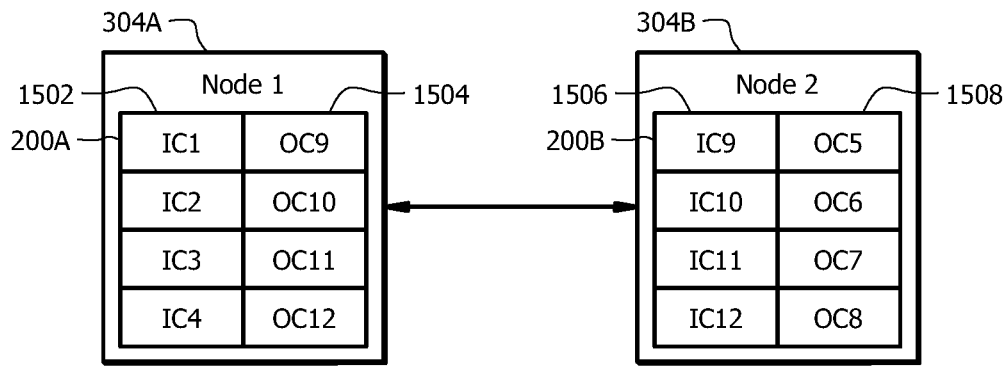
FIG. 15B is a schematic diagram of an embodiment of a second phase of a node table remapping.

FIG. 15B is a schematic diagram of an embodiment of a second phase of a node table remapping. In FIG. 15B, the first set of output correlithm objects 1504 in the first node table 200A and the second set of input correlithm objects 1506 in the second node table 200B are re-encoded using a correlithm object algorithm with a correlithm object key. The correlithm object key and the correlithm object algorithm may be similar to the correlithm object key 608 and the correlithm object algorithm 610 described in FIG. 6. For example, the first node 304A may provide the correlithm object key and an existing correlithm object as inputs to the correlithm object algorithm to generate a new correlithm object. In this example, the first node 304A may input a correlithm object (e.g. OC1) with the correlithm object key into the correlithm object algorithm to generate a new correlithm object (e.g. OC9). This process may be repeated for all of the correlithm objects 104 in the first set of output correlithm objects 1504. The second node 304B may perform a similar process for the correlithm objects 104 in the second set of input correlithm objects 1506. Re-encoding the first set of input correlithm objects 1504 and the second set of input correlithm objects 1506 changes the values of the output correlithm objects 1504 (shown as OC9, OC10, °CI 1, and OC12) and the values of the input correlithm objects 1506 (shown as IC9, IC10, IC11, and IC12). In this example, the values of the input correlithm objects 1502 that are linked with the output correlithm objects 1504 do not change. Similarly, the values of the output correlithm objects 1508 that are linked with the input correlithm objects 1506 do not change. Examples of techniques for re-encoding correlithm objects 104 in a node table 200 are described in FIGS. 16 and 17.

Figure 15C:
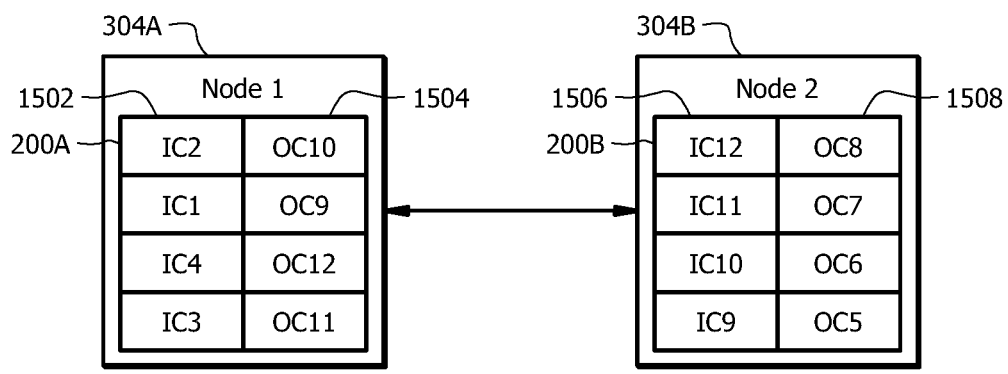
FIG. 15C is a schematic diagram of an embodiment of a third phase of a node table remapping.

FIG. 15C is a schematic diagram of an embodiment of a third phase of a node table remapping. In FIG. 15C, the order of the first set of input correlithm objects 1502 and the first set of output correlithm objects 1504 is shuffled. The relationship between the first set of input correlithm objects 1502 and the first set of output correlithm objects 1504 does not change when the order is shuffled. In other words, when an input correlithm object and a corresponding output correlithm object are shuffled their location within the first node table 200A changes, but the input correlithm object and the output correlithm object remain linked together. Similarly, the order of the second set of input correlithm objects 1506 and the second set of correlithm objects 1508 is shuffled. The ordering of the correlithm objects in the first node table 200A may be independent of the ordering of the correlithm objects in the second node table 200B. In other words, the correlithm objects in first node table 200A do not have to be in the same order as the correlithm objects in the second node table 200B. This means that correlithm objects in the first node table 200A can be shuffled independently from the correlithm objects in the second node table 200B. Examples of techniques for shuffling correlithm objects in a node table 200 are described in FIGS. 16 and 17.

Figure 16:
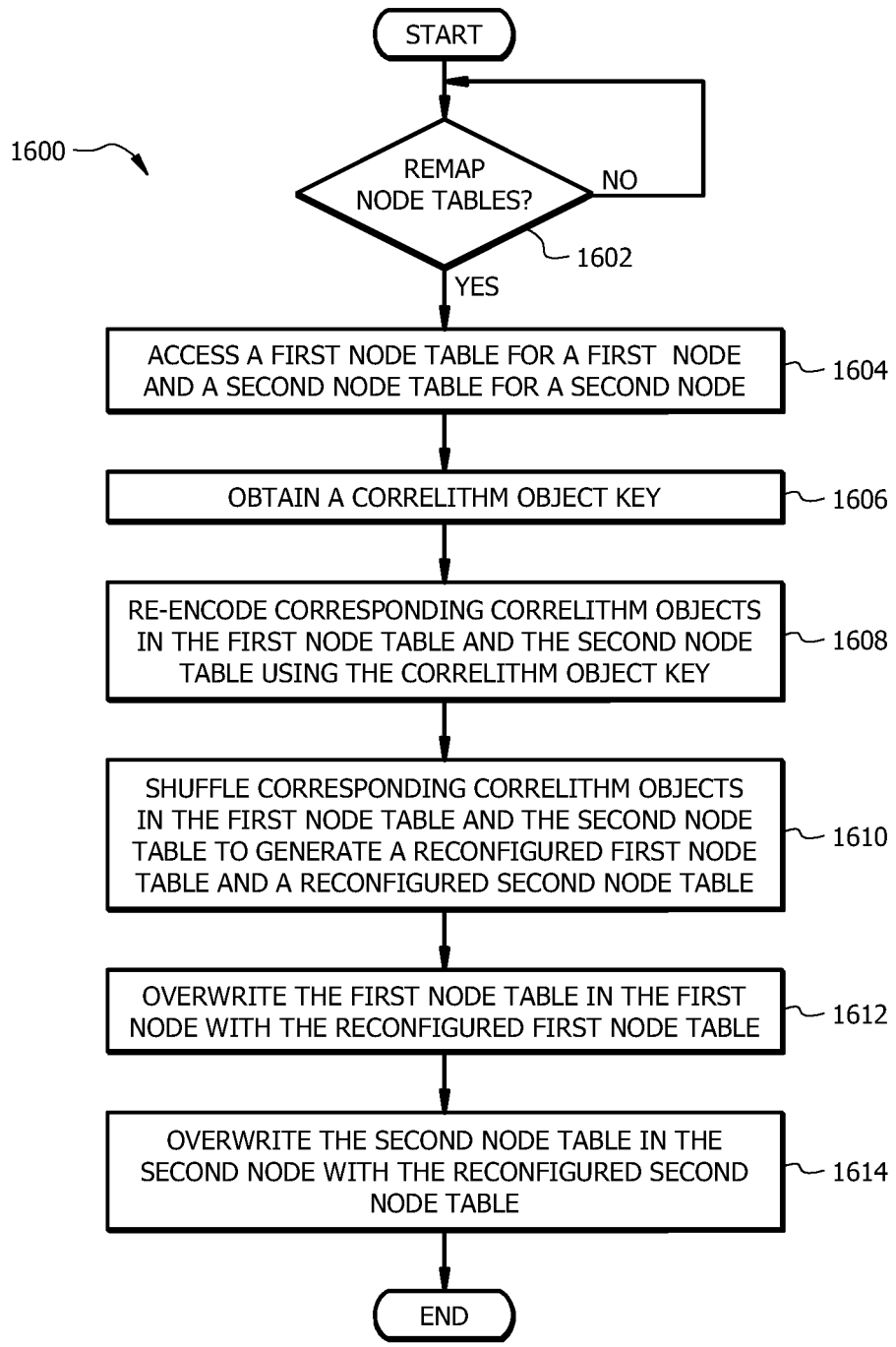
FIG. 16 is a flowchart of an embodiment of an offline node remapping method for a correlithm object processing system.

FIG. 16 is a flowchart of an embodiment of an offline node remapping method 1600 for a correlithm object processing system. For example, the correlithm object processing system may be configured similar to the correlithm object processing system 1000 described in FIG. 10. The offline node remapping method 1600 may be employed by the correlithm object processing system to periodically remap node tables 200 for nodes 304 in the network 1004. The offline node remapping method 1600 allows the system admin device 1002 to modify or generate new node tables 200 for nodes 304 by re-encoding and shuffling the correlithm objects in their node tables 200.

At step 1602, a system admin device 1002 determines whether to remap a set of node tables 200. In one embodiment, the system admin device 1002 is configured to monitor a timer for reconfiguring node tables 200. The system admin device 1002 may remap a set of node tables 200 in response to determining the timer has lapsed. The system admin device 1002 proceeds to step 1604 in response to determining to remap the set of node tables 200. Otherwise, the system admin device 1002 remains at step 1602.

At step 1604, a system admin device 1002 accesses a first node table 200 for a first node 304 and a second node table 200 for a second node 304. In one embodiment, accessing the node tables 200 comprises downloading the first node table 200 from the first node 304 and downloading the second node table from the second node 304. In another embodiment, the system admin device 1002 is configured to store copies of node tables 200 in a memory (e.g. memory 1008). In this example, accessing the node tables 200 comprises retrieving copies of the first node table 200 and the second node table 200 from the memory.

At step 1606, a system admin device obtains a correlithm object key. In one embodiment, the system admin device 1002 is configured to store correlithm object keys in a memory (e.g. memory 1008). In this example, accessing the correlithm object key comprises retrieving the correlithm object key from the memory. The correlithm object key is similar to the correlithm object key 608 described in FIG. 6.

At step 1608, a system admin device 1002 re-encodes corresponding correlithm objects in the first node table 200 and the second node table 200 using the correlithm object key. In one embodiment, the system admin device 1002 may re-encode the correlithm objects in the first node table 200 and the second node table 200 using a process similar to the process described in FIG. 15B. As an example, the system admin device 1002 may input the correlithm object key with a set of output correlithm objects from the first node table 200 into a correlithm object algorithm to generate a new set of output correlithm objects for the first node table 200. Similarly, the system admin device 1002 may input the correlithm object key with a set of input correlithm objects from the second node table 200 into the correlithm object algorithm to generate a new set of input correlithm objects for the second node table 200.

In one embodiment, re-encoding correlithm objects in the first node table 200 and the second node table 200 changes the number of bits used to represent the re-encoded correlithm objects. For example, an existing set of output correlithm objects may originally be represented by a 64-bit binary word. After re-encoding the output correlithm objects, the new set of output correlithm objects may be represented by a 128-bit binary word. As another example, after re-encoding the output correlithm objects, the new set of output correlithm objects may be represented by a 32-bit binary word. The re-encoding process may change the number of bit used to represent the correlithm objects to any suitable number of bits. In one embodiment, changing the number of bits used to represent the re-encoded correlithm objects only affects a portion of the node table. For example, the number of bits used to represent the re-encoded output correlithm objects in the first node table 200 may change, but the number of bits used to represent corresponding input correlithm objects in the first node table 200 may not change.

At step 1610, a system admin device 1002 shuffles corresponding correlithm objects in the first node table 200 and the second node table 200 to generate a reconfigured first node table 200 and a reconfigured second node table 200. In one embodiment, the system admin device 1002 may shuffle the correlithm objects in the first node table 200 and the second node table 200 using a process similar to the process described in FIG. 15C. Shuffling the order of the re-encoded correlithm objects changes the location of the correlithm objects within the first node table, but maintains the link between the first set of input correlithm objects and the first set of output correlithm objects in the first node table 200. In one embodiment, the system admin device 1002 shuffles the correlithm objects in the first node 200 to be in a different order than the correlithm objects in the second node table 200.

At step 1612, a system admin device 1002 overwrites the first node table 200 in the first node 304 with the reconfigured first node table 200. In one embodiment, overwriting the first node table 200 comprises sending the reconfigured node table 200 to the device implementing the first node 304. The device links the reconfigured node table 200 with the first node 304 in response to receiving the reconfigured node table 200. Once the first node 304 is linked with the reconfigured node table 200, the first node 304 may begin processing correlithm objects using the reconfigured node table 200.

At step 1614, a system admin device 1002 overwrites the second node table 200 in the second node 304 with the reconfigured second node table 200. In one embodiment, overwriting the second node table 200 comprises sending the reconfigured node table 200 to the device implementing the second node 304. The device links the reconfigured node table 200 with the second node 304 in response to receiving the reconfigured node table 200. Once the second node 304 is linked with the reconfigured node table 200, the second node 304 may begin processing correlithm objects using the reconfigured node table 200.

Figure 17:
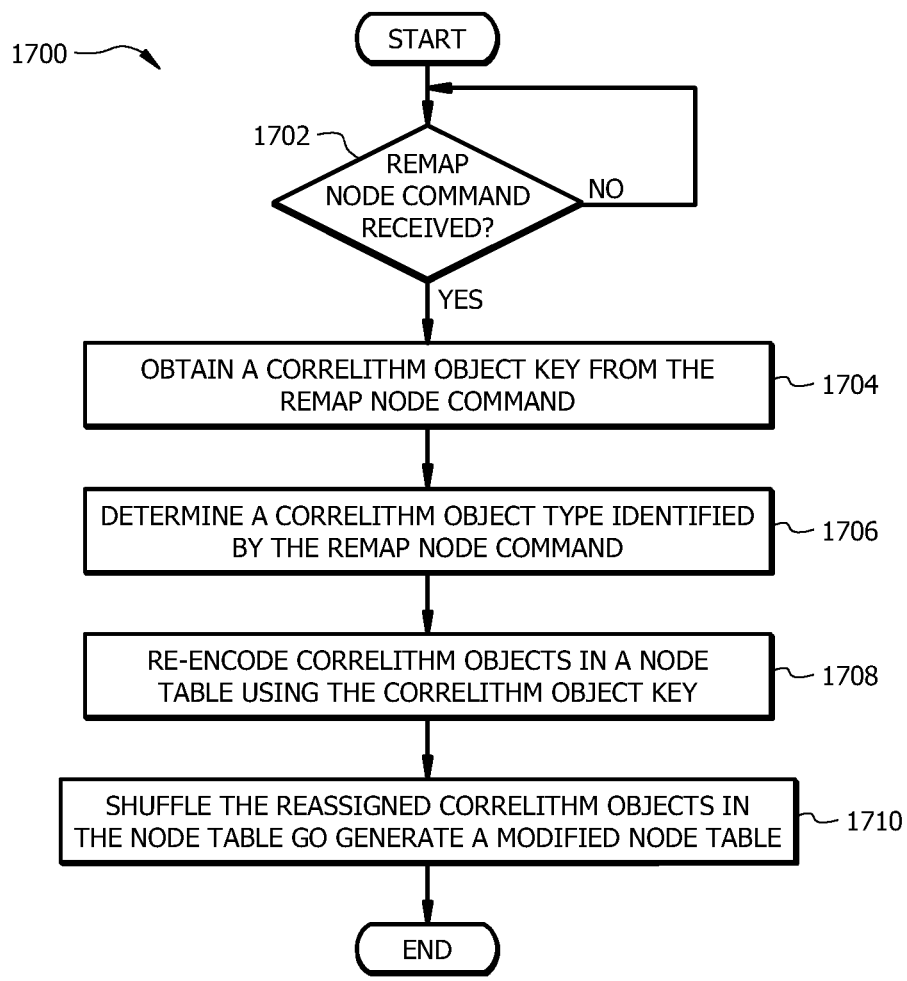
FIG. 17 is a flowchart of an embodiment of an online node remapping method for a correlithm object processing system.

FIG. 17 is a flowchart of an embodiment of an online node remapping method 1700 for a correlithm object processing system. For example, the correlithm object processing system may be configured similar to the correlithm object processing system 1000 described in FIG. 10. The online node remapping method 1700 may be employed by the correlithm object processing system to periodically remap node tables 200 for nodes 304 in the network 1004. The online node remapping method 1700 allows the nodes 304 in the network 1004 to remap their node tables 200 instead of having a system admin device 1002 remap the nodes tables 200 like the offline node remapping node method 1600 described in FIG. 16.

As an example, a system admin device 1002 may periodically send a remap node command to the node 304. In one embodiment, the system admin device 1002 is configured to monitor a timer for reconfiguring node tables 200. The system admin device 1002 may send a remap node command to the node 304 in response to determining the timer has lapsed. In one embodiment, the system admin device 1002 sends the remap node command using a secure connection (e.g. secure connection 604). The remap node command is used to trigger the node 304 to remap its node table 200. In one embodiment, the remap node command is an encrypted message that comprises a correlithm object key and identifies a correlithm object type. The correlithm object type identifies the type of correlithm objects 104 in the node table 200 that are to be remapped. For example, the correlithm object type may indicate either an input correlithm object type or an output correlithm object type. Any suitable identifier or flag bits may be used to indicate the correlithm object type. As an example, setting a flag bit with a binary value of one may indicate an input correlithm object type and setting a flag bit with a binary value of zero may indicate an output correlithm object type. In other examples, the correlithm object type may be identified using an alphanumeric string. In other embodiments, the remap node command may further comprise a correlithm object algorithm or an identifier for a correlithm object algorithm that is to be used when re-encoding the correlithm objects. In other embodiments, the remap node command may further comprise any other suitable information for remapping a node table 200. The remap node command may be sent as any suitable type of message or command as would be appreciated by one of ordinary skill in the art.

At step 1702, a node 304 determines whether a remap node command has been received. The node 304 proceeds to step 1704 in response to determining the remap node command has been received. Otherwise, the node 304 remains at step 1702 to wait for a remap node command. At step 1704, the node 304 obtains a correlithm object key from the remap node command. The node 304 may process (e.g. decrypt) the remap node command to extract the correlithm object key and any other information from the remap node command. The correlithm object key is similar to the correlithm object key 608 described in FIG. 6. In one embodiment, the node 304 is configured to suspend operations (e.g. sending, receiving, and/or processing correlithm objects 104) in response to receiving the remap node command. In this case, the node 304 may resume operations after the node table 200 has been remapped.

At step 1706, the node 304 determines a correlithm object type identified by the remap node command. In one embodiment, the correlithm object type identifies an input correlithm object type. In this example, the node 304 will re-encode a set of input correlithm objects in a node table 200 when the correlithm object type identifies an input correlithm object type. In another embodiment, the correlithm object type identifies an output correlithm object type. In this example, the node 304 will re-encode a set of output correlithm objects in a node table 200 when the correlithm object type identifies an output correlithm object type.

At step 1708, the node 304 re-encodes correlithm objects in a node table 200 using the correlithm object key and a correlithm object algorithm. In one embodiment, the node 304 may re-encode the correlithm objects in the node table 200 using a process similar to the process described in FIG. 15B. For example, the node 304 may input the correlithm object key obtained from the remap node command with the set of correlithm objects identified by the correlithm object type in the remap node command into a correlithm object algorithm to generate a new set of correlithm objects. In one embodiment, the node 304 obtains the correlithm object algorithm from the remap node command. In another embodiment, the remap node command identifies a correlithm object algorithm and the node 304 obtains the identified correlithm object algorithm from a memory.

In one embodiment, re-encoding correlithm objects in the node table 200 changes the number of bits used to represent the re-encoded correlithm objects. For example, an existing set of output correlithm objects may originally be represented by a 64-bit binary word. After re-encoding the output correlithm objects, the new set of output correlithm objects may be represented by a 128-bit binary word. As another example, after re-encoding the output correlithm objects, the new set of output correlithm objects may be represented by a 32-bit binary word. The re-encoding process may change the number of bit used to represent the correlithm objects to any suitable number of bits.

At step 1710, the node 304 shuffles the reassigned correlithm objects in the node table 200 to generate a modified node table. In one embodiment, the node 304 may shuffle the correlithm objects in the node table 200 using a process similar to the process described in FIG. 15C. Shuffling the order of the re-encoded correlithm objects maintains the link between the first set of input correlithm objects and the first set of output correlithm objects in the node table 200.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system configured to emulate a correlithm object processing system, comprising one or more devices configured to implement a network comprising:
one or more interior nodes, wherein the one or more interior nodes are not in direct signal communication with devices outside of the network; and
a first processor configured to emulate a first edge node and in signal communication with the one or more interior nodes, wherein:
the first edge node is linked with a first node table that identifies:
a first set of input correlithm objects, wherein each correlithm object in the first set of input correlithm objects is an n-bit digital word of binary values; and
a first set of output correlithm objects corresponding with the first set of input correlithm objects, wherein each correlithm object in the first set of output correlithm objects is an n-bit digital word of binary values, and "n" is an integer; and
the first processor is configured to:
receive a first correlithm object from a first device outside of the network;
compare the first correlithm object with each of the input correlithm objects stored in the first node table;
determine distances between the first correlithm object and each input correlithm object in the first node table, wherein a distance between the first correlithm object and an input correlithm object is based on differences between a binary string representing the first correlithm object and binary strings linked with each of the input correlithm objects;
identify an input correlithm object from the first node table with a shortest distance to the first correlithm object;
fetch a second correlithm object from the first node table linked with the identified input correlithm object;
send the second correlithm object to the one or more interior nodes; and
a second processor configured to emulate a second edge node in signal communication with the one or more interior nodes, wherein:
the second edge node is linked with a second node table that identifies:
a second set of input correlithm objects; and
a second set of output correlithm objects linked with the second set of input correlithm objects; and
the second processor is configured to:
receive a third correlithm object from the one or more interior nodes;
compare the third correlithm object with each of the input correlithm objects stored in the second node table;
determine distances between the third correlithm object and each input correlithm object in the second node table;
identify an input correlithm object from the second node table with the shortest distance to the third correlithm object;
fetch a fourth correlithm object from the second node table linked with the identified input correlithm object; and
send the fourth correlithm object to a second device outside of the network, wherein the first device and the second device are different devices;
wherein determining distances between the first correlithm object and each input correlithm object in the first node table comprises:
performing an XOR operation between the first correlithm object and a corresponding input correlithm object in the first node table to generate a binary string;
counting the number of logical high values in the binary string, wherein the number of logical high values corresponds with a distance; and
the shortest distance associated with the first correlithm object has a smallest number of logical high values in the binary string.

2. The system of claim 1, wherein determining distances between the third correlithm object and each input correlithm object in the second node table comprises determining a Hamming distance between the third correlithm object and an input correlithm object in the second node table.

3. The system of claim 1, wherein the one or more devices implementing the network are in a different physical location than the first device and the second device.

4. The system of claim 1, wherein:
the first processor uses an unsecure channel to receive the first correlithm object; and
the second processor uses an unsecure channel to send the fourth correlithm object to the second device.

5. The system of claim 1, wherein pairs of input correlithm object and output correlithm objects in the first node table are different than pairs of input correlithm object and output correlithm objects in the second node table.

6. The system of claim 1, wherein pairs of input correlithm object and output correlithm objects in the first node table are same as pairs of input correlithm object and output correlithm objects in the second node table.

7. A communication method, comprising:
receiving, by a first processor configured to emulate a first edge node, a first correlithm object from a first device outside of the network;
comparing the first correlithm object with each input correlithm object stored in a first node table;
determining, by the first processor, distances between the first correlithm object and each input correlithm object in the first node table, wherein:
the first node table identifies:
a first set of input correlithm objects, wherein each correlithm object in the first set of input correlithm objects is an n-bit digital word of binary values wherein "n" is an integer; and
a first set of output correlithm objects corresponding with the first set of input correlithm objects, wherein each correlithm object in the first set of output correlithm objects is an n-bit digital word of binary values;
a distance between the first correlithm object and an input correlithm object is based on differences between a binary string representing the first correlithm object and binary strings linked with each of the input correlithm objects;
identifying, by the first processor, an input correlithm object from the first node table with a shortest distance to the first correlithm object;
fetching, by the first processor, a second correlithm object from the first node table linked with the identified input correlithm object;
sending, by the first processor, the second correlithm object to one or more interior nodes, wherein the one or more interior nodes are not in direct signal communication with devices outside of the network;
receiving, by a second processor configured to emulate a second edge node, a third correlithm object from the one or more interior nodes;
comparing the third correlithm object with each input correlithm object stored in a second node table;
determining, by the second processor, distances between the third correlithm object and each input correlithm object in the second node table, wherein the second node table identifies:
a second set of input correlithm objects; and
a second set of output correlithm objects linked with the second set of input correlithm objects;
identifying, by the second processor, an input correlithm object from the second node table with the shortest distance to the third correlithm object;
fetching, by the second processor, a fourth correlithm object from the second node table linked with the identified input correlithm object; and
sending, by the second processor, the fourth correlithm object to a second device outside of the network, wherein the first device and the second device are different devices;
wherein determining distances between the first correlithm object and each input correlithm object in the first node table comprises:
performing an XOR operation between the first correlithm object and a correlithm object in the first node table to generate a binary string;
counting the number of logical high values in the binary string, wherein the number of logical high values corresponds with a distance; and
the shortest distance associated with the first correlithm object has a smallest number of logical high values in the binary string.

8. The method of claim 7, wherein determining distances between the third correlithm object and each input correlithm object in the second node table comprises determining a Hamming distance between the third correlithm object and an input correlithm object in the second node table.

9. The method of claim 7, wherein one or more devices implementing the network are in a different physical location than the first device and the second device.

10. The method of claim 7, wherein:
receiving the first correlithm object comprises using an unsecure channel to receive the first correlithm object; and
sending the fourth correlithm object comprises using an unsecure channel to send the fourth correlithm object.

11. The method of claim 7, wherein pairs of input correlithm object and output correlithm objects in the first node table are different than pairs of input correlithm object and output correlithm objects in the second node table.

12. The method of claim 7, wherein pairs of input correlithm object and output correlithm objects in the first node table are same as pairs of input correlithm object and output correlithm objects in the second node table.

13. A device configured to emulate a correlithm object processing system, comprising:
a network interface configured to communicate correlithm objects, wherein a correlithm object is an n-bit digital word of binary values;
a memory operable to store:
a first node table that identifies:
a first set of input correlithm objects, wherein each correlithm object in the first set of input correlithm objects is an n-bit digital word of binary values; and
a first set of output correlithm objects corresponding with the first set of input correlithm objects, wherein each correlithm object in the first set of output correlithm objects is an n-bit digital word of binary values, and "n" is an integer; and
a second node table that identifies:
a second set of input correlithm objects; and
a second set of output correlithm objects linked with the second set of input correlithm objects;
a network comprising:
one or more interior nodes, wherein the one or more interior node are not in direct signal communication with devices outside of the network; and
a first processor configured to emulate a first edge node configured to:
receive a first correlithm object from a first device outside of the network via the network interface;
compare the first correlithm object with each of the input correlithm objects stored in the first node table;
determine distances between the first correlithm object and each input correlithm object in the first node table, wherein a distance between the first correlithm object and an input correlithm object is based on differences between a binary string representing the first correlithm object and binary strings linked with each of the input correlithm objects;

identify an input correlithm object from the first node table with a shortest distance to the first correlithm object;
fetch a second correlithm object from the first node table linked with the identified input correlithm object;
send the second correlithm object to the one or more interior nodes; and
a second processor configured to emulate a second edge node configured to:
receive a third correlithm object from the one or more interior nodes;
compare the third correlithm object with each of the input correlithm objects stored in the second node table;
determine distances between the third correlithm object and each input correlithm object in the second node table;
identify an input correlithm object from the second node table with the shortest distance to the third correlithm object;
fetch a fourth correlithm object from the second node table linked with the identified input correlithm object; and
send the fourth correlithm object to a second device outside of the network via the network interface, wherein the first device and the second device are different devices
wherein determining distances between the first correlithm object and each input correlithm object in the first node table comprises:
performing an XOR operation between the first correlithm object and a corresponding input correlithm object in the first node table to generate a binary string;
counting the number of logical high values in the binary string, wherein the number of logical high values corresponds with a distance; and
the shortest distance associated with the first correlithm object has a smallest number of logical high values in the binary string.

14. The device of claim 13, wherein determining distances between the third correlithm object and each input correlithm object in the second node table comprises determining a Hamming distance between the third correlithm object and an input correlithm object in the second node table.

15. The device of claim 13, wherein:
the network interface uses an unsecure channel to receive the first correlithm object; and
the network interface uses an unsecure channel to send the fourth correlithm object to the second device.

16. The device of claim 13, wherein pairs of input correlithm object and output correlithm objects in the first node table are different than pairs of input correlithm object and output correlithm objects in the second node table.

17. The device of claim 13, wherein pairs of input correlithm object and output correlithm objects in the first node table are same as pairs of input correlithm object and output correlithm objects in the second node table.

\* \* \* \* \*